United States Patent [19]

Hedrick

[11] 4,319,333
[45] Mar. 9, 1982

[54] MACH AIRSPEED INDICATOR

[75] Inventor: Geoffrey S. M. Hedrick, Malvern, Pa.

[73] Assignee: Smiths Industries Limited, London, England

[21] Appl. No.: 105,035

[22] Filed: Dec. 19, 1979

[51] Int. Cl.³ ............................................... G01P 5/00
[52] U.S. Cl. .................... 364/565; 364/424; 324/160; 73/488
[58] Field of Search ............... 364/565, 424, 433, 434, 364/440, 443; 324/160, 163; 73/178 R, 488

[56] References Cited

U.S. PATENT DOCUMENTS

| | | | |
|---|---|---|---|
| 3,617,721 | 11/1971 | Foster | 364/424 |
| 3,641,323 | 2/1972 | Hughes et al. | 364/433 |
| 3,930,143 | 12/1975 | Muller | 364/433 |
| 4,163,387 | 8/1979 | Schroeder | 364/433 |
| 4,180,859 | 12/1979 | Breant et al. | 364/433 |

Primary Examiner—Errol A. Krass
Assistant Examiner—Gary Chin
Attorney, Agent, or Firm—Hubbell, Cohen, Stiefel & Gross

[57] ABSTRACT

A mach airspeed indicator capable of internally determining mach number and VMO from measured altitude and airspeed information directly. An internal microprocessor, capable of storing a plurality of selectable VMO curves and a table of mach number versus $q_c/P_s$, receives the measured altitude and airspeed information, determines VMO and mach number therefrom, and directly drives the VMO and mach number displays where $q_c$ represents the impact pressure and $P_s$ represents the static pressure. The measured altitude and airspeed signals are analog synchro signals. In order to drive the VMO display, the received analog altitude synchro signals are digitized in a synchro-to-digital converter comprising a single multiplying digital-to-analog converter for both $\sin \theta$ and $\cos \theta$ synchro functions, and fed to the microprocessor which verifies the appropriate VMO from the preselected VMO curve, and drives the VMO analog pointer via a stepper motor servo loop closed by the microprocessor. If the VMO is exceeded, the microprocessor provides an overspeed alarm control signal. In order to drive the mach number display, both the received measured analog altitude and airspeed synchro signals are received, digitized in the synchro-to-digital converter, and fed to the microprocessor. The microprocessor converts the digital airspeed signal into $q_c/P_s$ signal which is used to determine mach number from the stored values. The microprocessor then drives the mach number counter display via a separate stepper motor servo loop closed by the common microprocessor.

70 Claims, 29 Drawing Figures

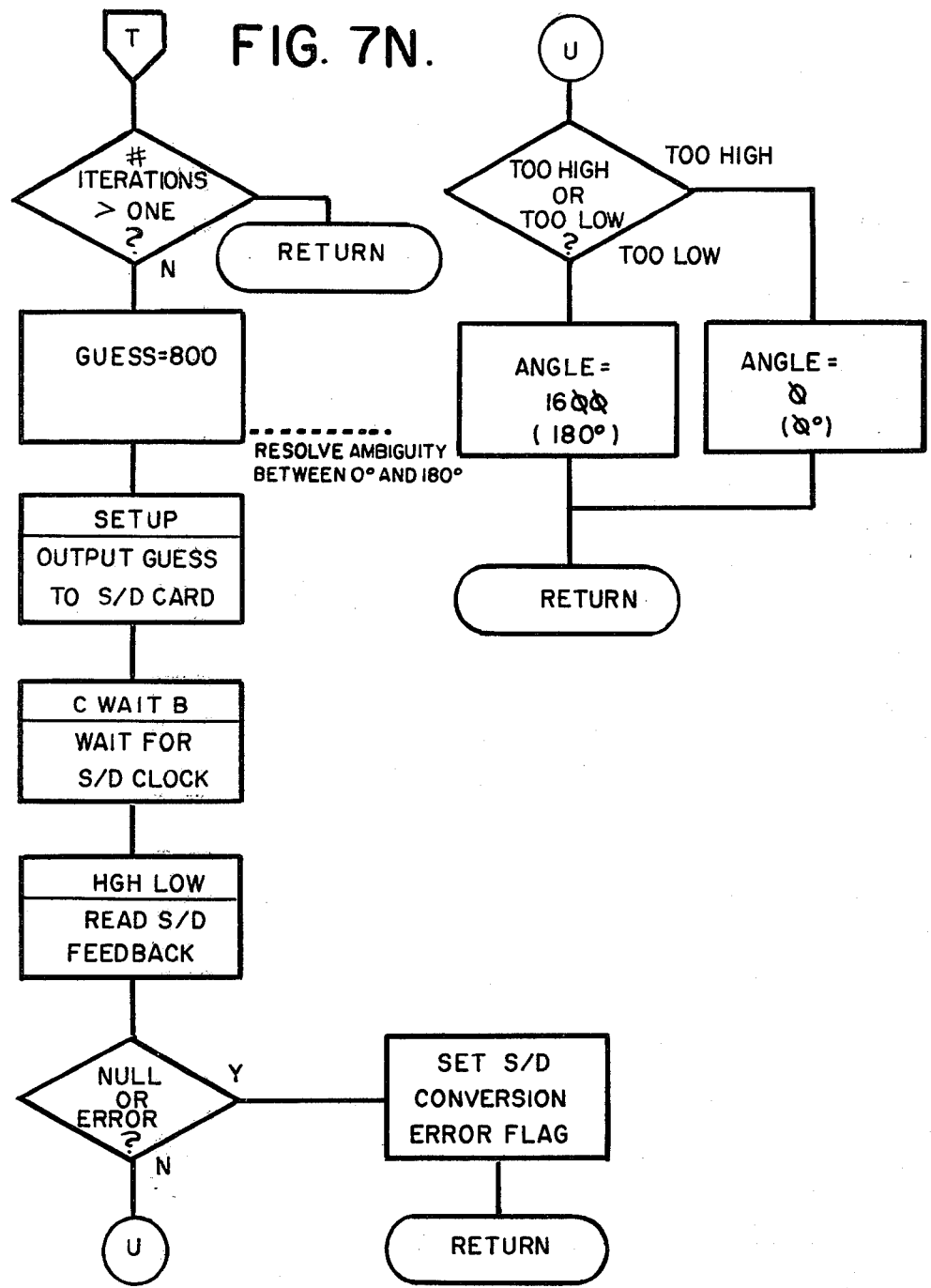

MACH AIRSPEED INDICATOR

CROSS-REFERENCE TO RELATED APPLICATIONS

This application is related to my contemporaneously filed U.S. patent applications entitled "Stepper Servo Motor" and "Synchro-To-Digital Conversion Apparatus."

BACKGROUND OF THE INVENTION

1. Field of the Invention

The present invention relates to airspeed indicator apparatus and particularly to mach airspeed indicators capable of displaying mach and VMO from measured altitude and airspeed data.

2. Description of the Prior Art

Air data computers are well known in the aircraft industry which furnish a variety of information to the pilot. For example, U.S. Pat. No. 3,641,323 discloses a system employing an air data computer for displaying information indicative of deviations of the aircraft from the design point. In the disclosed system, the central computer is programmed with the profile representing optimum performance for the aircraft and stores several such profiles which are selectable for a given flight. These stored profiles of altitude versus mach number are used to determine the path of maximum operating efficiency for the aircraft. The computer senses the actual aircraft altitude and provides an output proportional to the programmed vehicle speed translated into mach number according to the selected stored profile in order to display the desired airspeed or mach number for optimum efficiency at a given altitude while also displaying the speed error in terms of mach number.

Another type of prior art air data computer is disclosed in U.S. Pat. No. 3,232,530, which discloses a mechanical type of air data computer which provides outputs which are functions of mach number directly from a motor which is caused to turn as a function of mach number. The motor which runs directly as a function of mach number is caused to respond to the difference between total pressure and static pressure and as such the system takes the measured pressure differential indicative of the difference between measured total pressure and static pressure to directly compute the mach number and display it.

Still another type of air data computer is disclosed in U.S. Pat. No. 3,843,877, which discloses the use of direct current-to-synchro and/or to-digital signal conversion for the sensed altitude signals. The disclosed system uses a source of signals proportional to mach number in order to compensate for the effects of mach number on the static source for the pressure altitude sensor.

Other types of prior art air data computer systems, by way of example, are disclosed in U.S. Pat. Nos. 4,163,387; 4,114,842; 4,039,165; and 4,047,001. U.S. Pat. No. 4,163,387 discloses the use of a microprocessor to display sensed altitude and other parameters to cabin passengers. U.S. Pat. No. 4,114,842 discloses the use of an air data computer in an acceleration limited preselect altitude capture and control system. U.S. Pat. No. 4,039,165 discloses a circuit for deriving a rate signal from an AC signal proportional to altitude displacement which is free from power supply and vertical gyro disturbances.

However, there are no prior art mach airspeed indicators known to applicant capable of internally computing VMO and/or mach number from measured altitude and airspeed for directly driving the VMO and/or mach displays, such as by closing a stepper servo motor servo loop for such a display by the internal computer.

With respect to such stepper servo motors, although their use is known in aircraft instrumentation, applicant is not aware of any such efficient low power stepper servo motor having a low inertia and a high step rate. Moreover, although permanent magnet stepper servo motors are well known, none are known to applicant in which a rare earth cobalt permanent magnet rotor is employed, nor one in which such a rare earth cobalt magnet is skewed so as to reduce the detent torque. This is so even though the use of rare earth cobalt magnets per se in high power large motors is known in which a high detent occurs, as is the use of skewed rotors per se which result in small torque.

Synchro-to-digital conversion is a well known technique, such as disclosed in U.S. Pat. Nos. 3,250,905; 3,832,707; 3,787,785; 3,071,324; 3,685,034; 3,744,050 and 3,737,885. Although some of these prior art techniques, such as disclosed in U.S. Pat. Nos. 3,737,885; 3,744,050 and 3,685,034, utilize multiplying digital-to-analog converters, they require separate converters for the sin and cos synchro functions. Thus, there are no synchro-to-digital converters known to applicant employing a single common multiplying digital-to-analog converter for synthesizing both sine and cosine.

These disadvantages of the prior art are overcome by the present invention.

SUMMARY OF THE INVENTION

The present invention is a mach airspeed indicator capable of internally determining mach number and VMO from measured altitude and airspeed information directly. An internal microprocessor, capable of storing a plurality of selectable VMO curves and a table of mach number versus $q_c/P_s$, receives the measured altitude and airspeed information, determines VMO and mach number therefrom, and directly drives the VMO and mach number displays. The measured altitude and airspeed signals are analog synchro signals. In order to drive the VMO display, the received analog altitude synchro signals are digitized in a synchro-to-digital converter comprising a single multiplying digital-to-analog converter for both $\sin \theta$ and $\cos \theta$ synchro functions, and fed to the microprocessor which verifies the appropriate VMO from the preselected VMO curve, and drives the VMO analog pointer via a stepper motor servo loop closed by the microprocessor. If the VMO is exceeded, the microprocessor provides an overspeed alarm control signal. In order to drive the mach number display, both the measured analog altitude and airspeed synchro signals are received, digitized in the synchro-to-digital converter, and fed to the microprocessor. The microprocessor converts the digital airspeed signal into $q_c/P_s$ signal which is used to determine mach number from the stored values. The microprocessor then drives the mach number counter display via a separate stepper motor servo loop closed by the common microprocessor. The stepper motor servo preferably employs permanent magnet rotor comprising a rare earth cobalt magnet which is skewed so as to distribute the magnetic force over a plurality of detent pole teeth, such as three, for reducing any associated detent torque, providing a low power, efficient, low inertia servo motor having a high step rate.

DETAILED DESCRIPTION OF PREFERRED EMBODIMENTS

Figure 1:
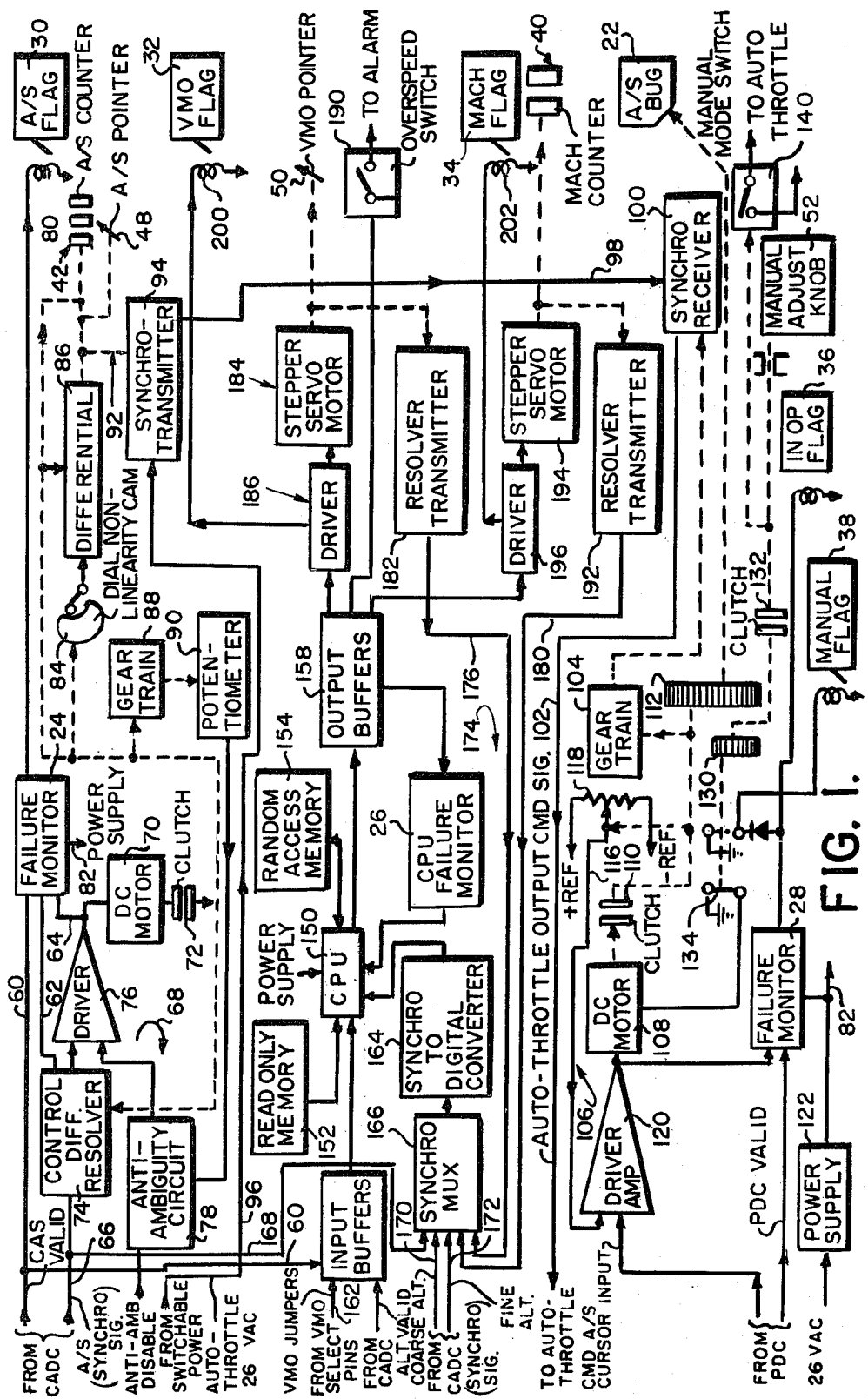
FIG. 1 is a functional block diagram of the preferred mach airspeed indicator of the present invention.
Figure 6A:
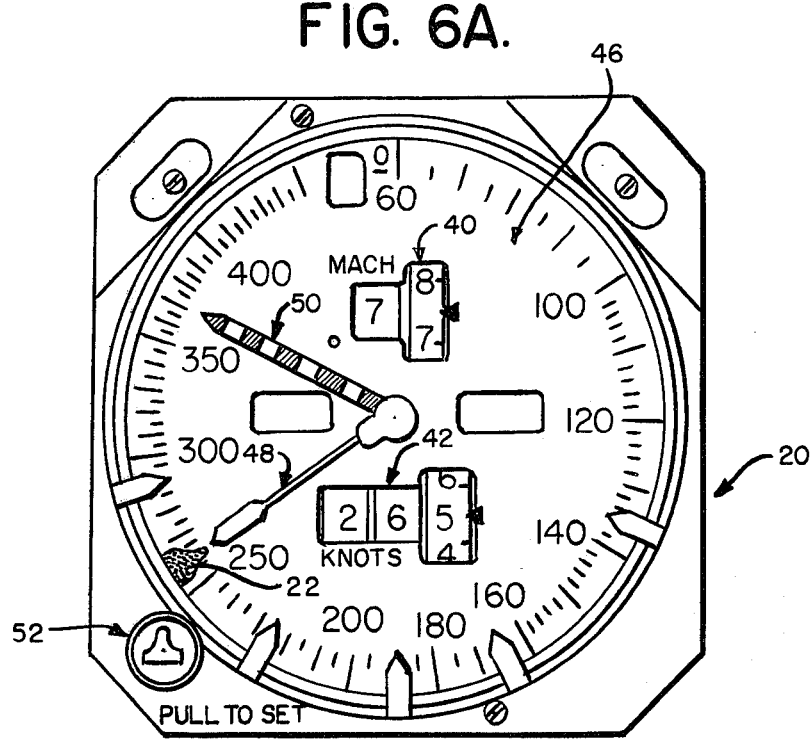
FIGS. 6A and 6B, collectively referred to as FIG. 6, are front elevational views of the face plate of the mach airspeed indicator of FIG. 1, with FIG. 6B being a partial view of the arrangement of FIG. 6A with the failure of flags illustratively being shown in the display position.
Figure 6B:
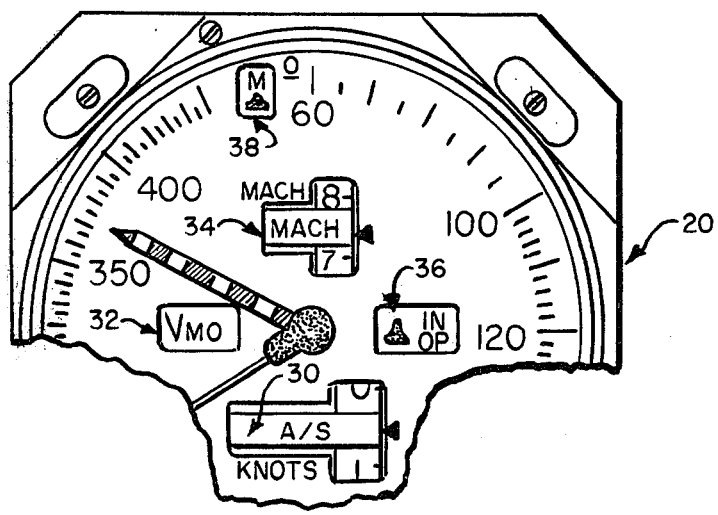
Figure 7A:
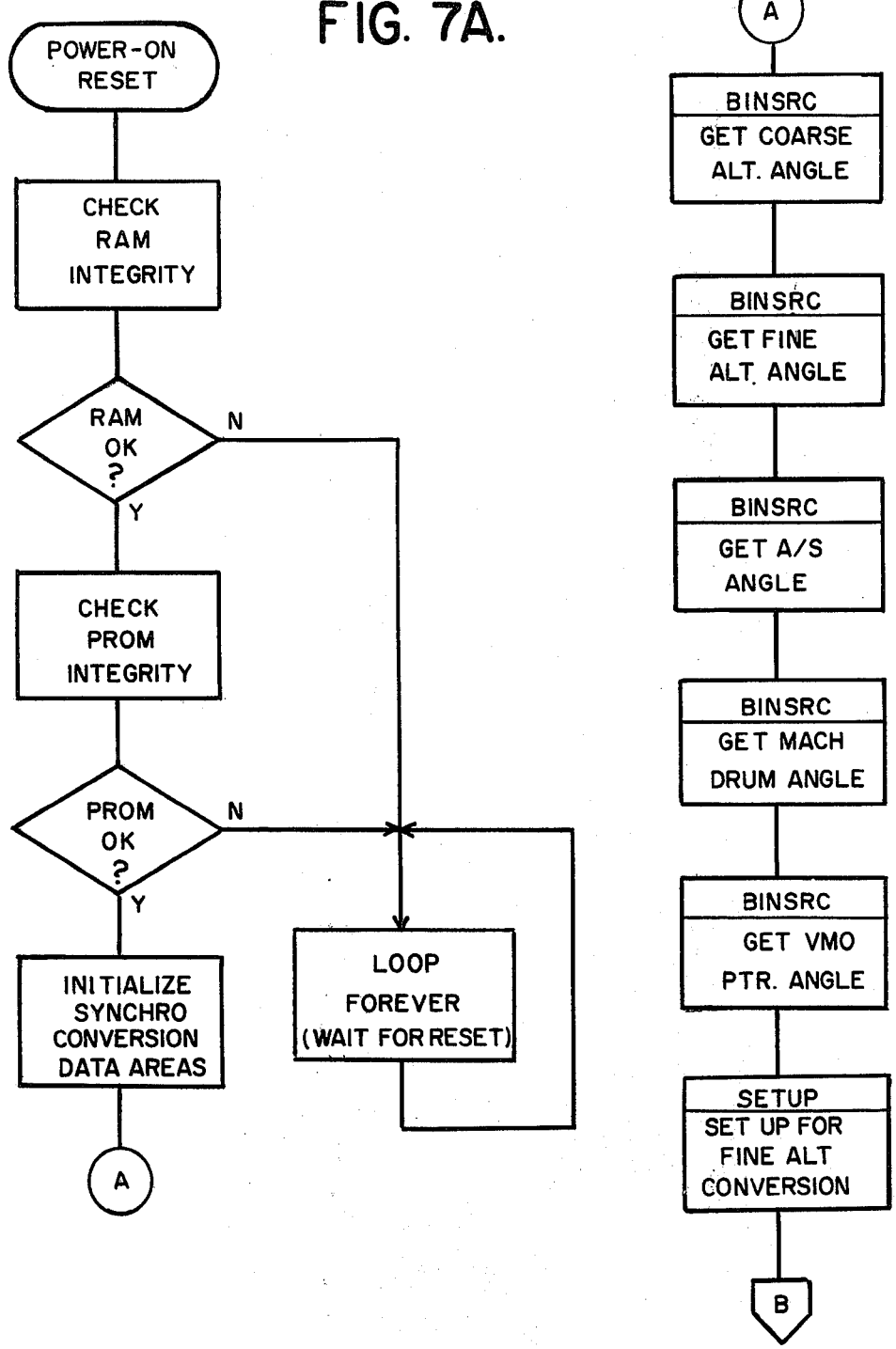
FIGS. 7A-7V, collectively referred to as FIG. 7, is a logic flow diagram illustrating the determination of mach number by the microprocessor portion of the mach airspeed indicator of FIG. 1.
Figure 7B:
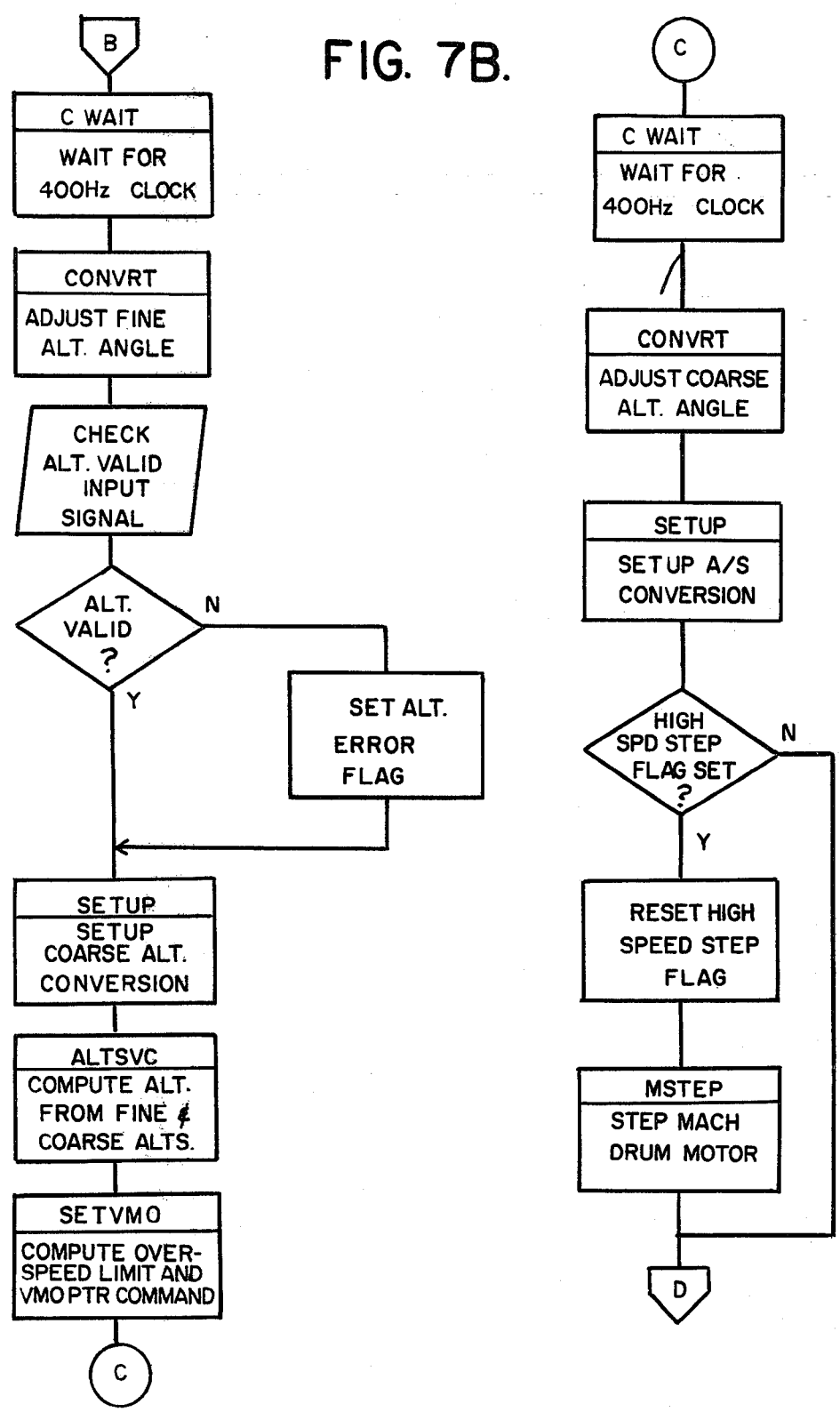
Figure 7C:
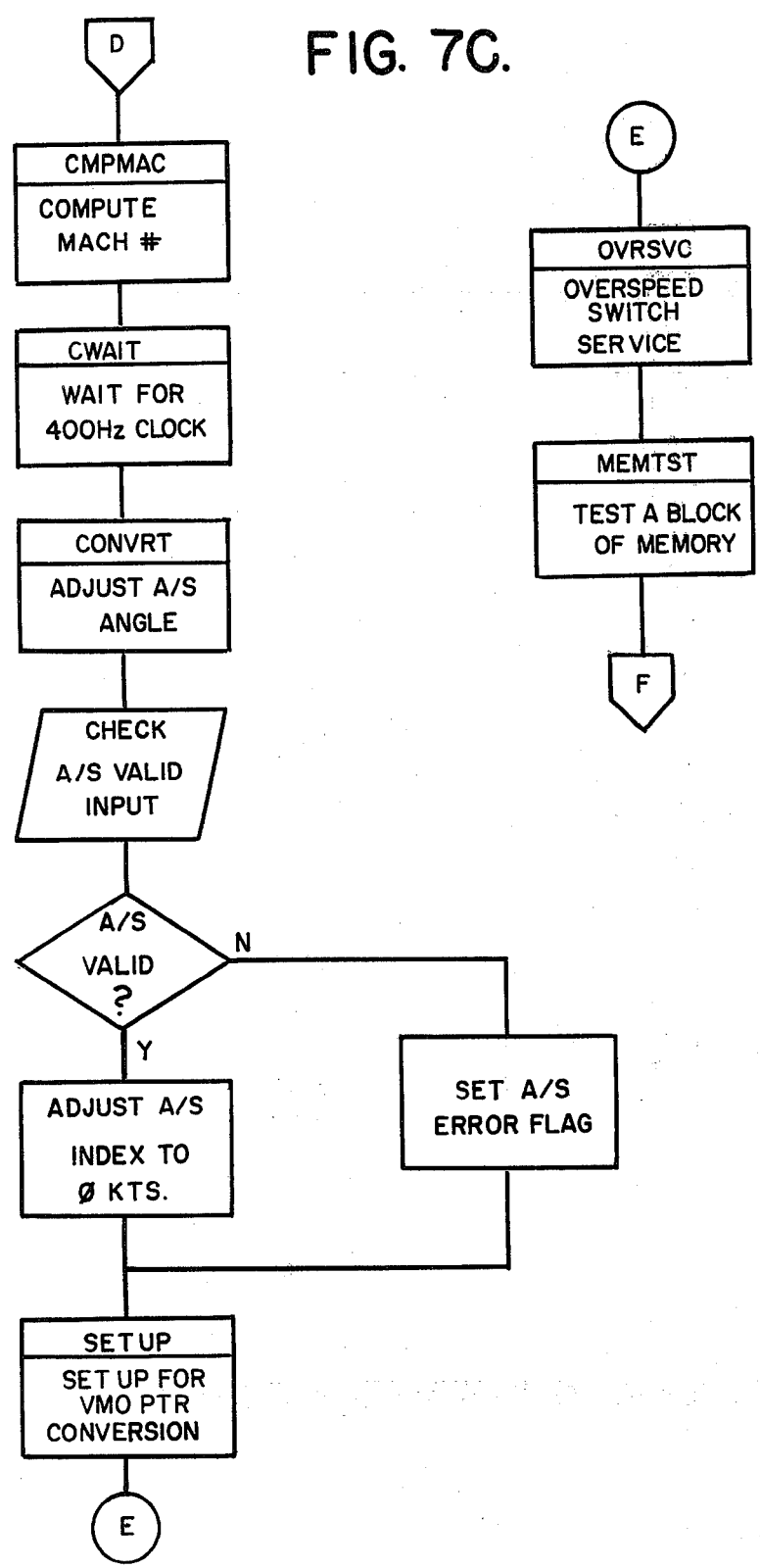
Figure 7D:
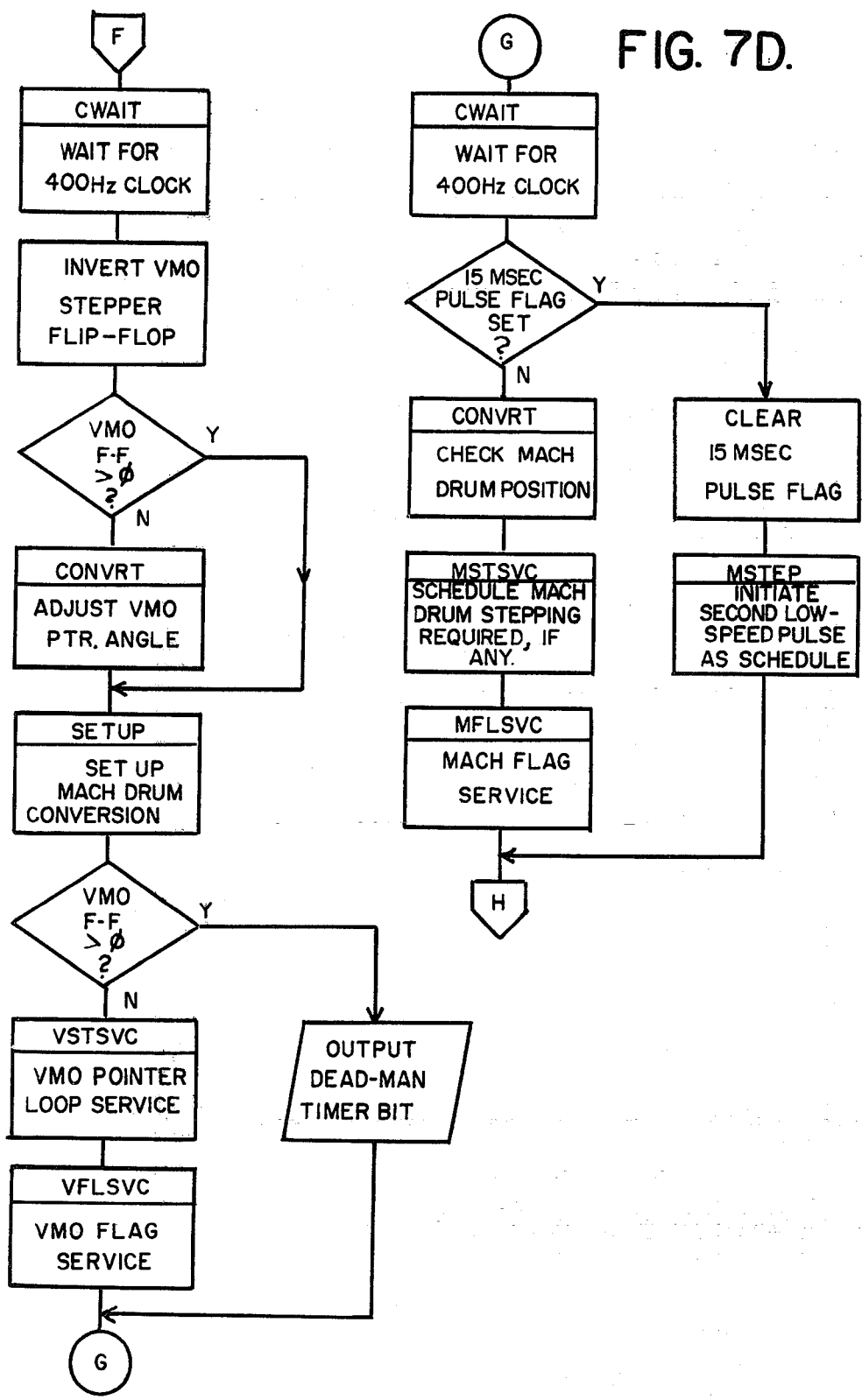
Figure 7E:
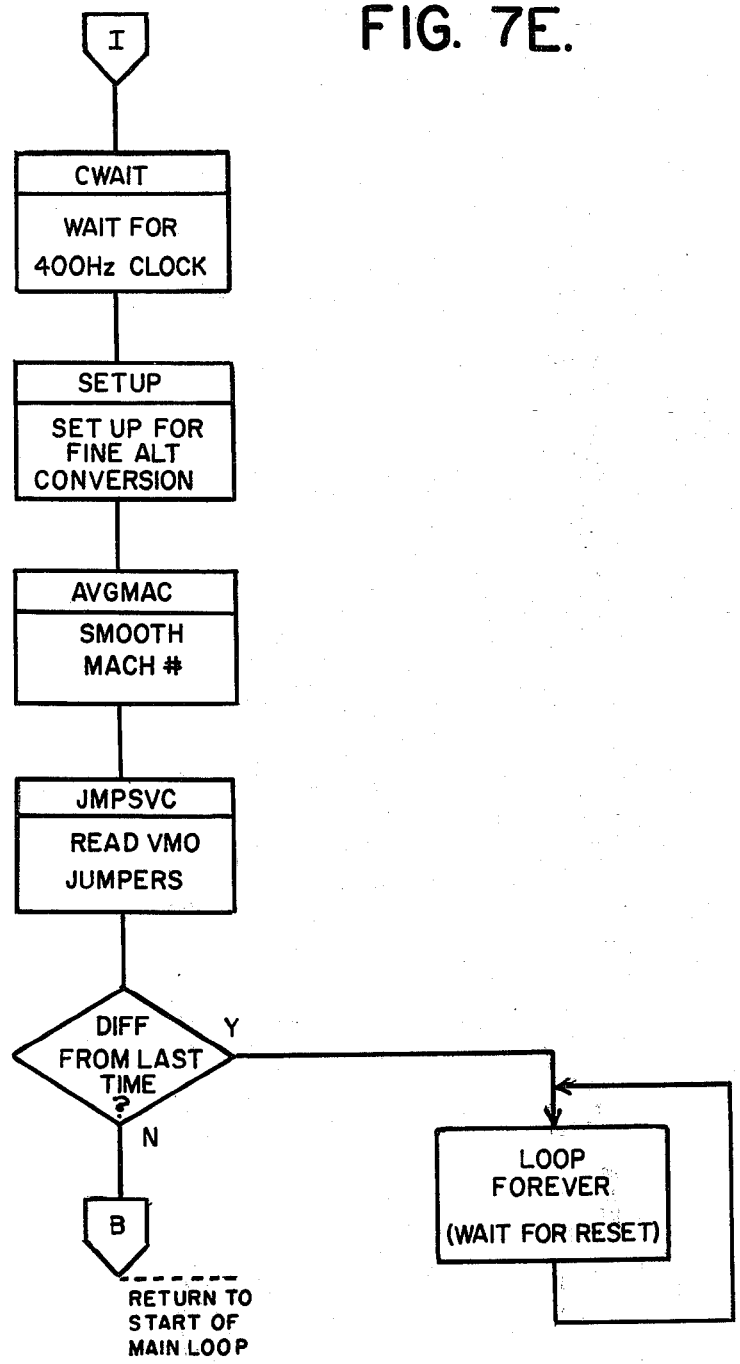
Figure 7F:
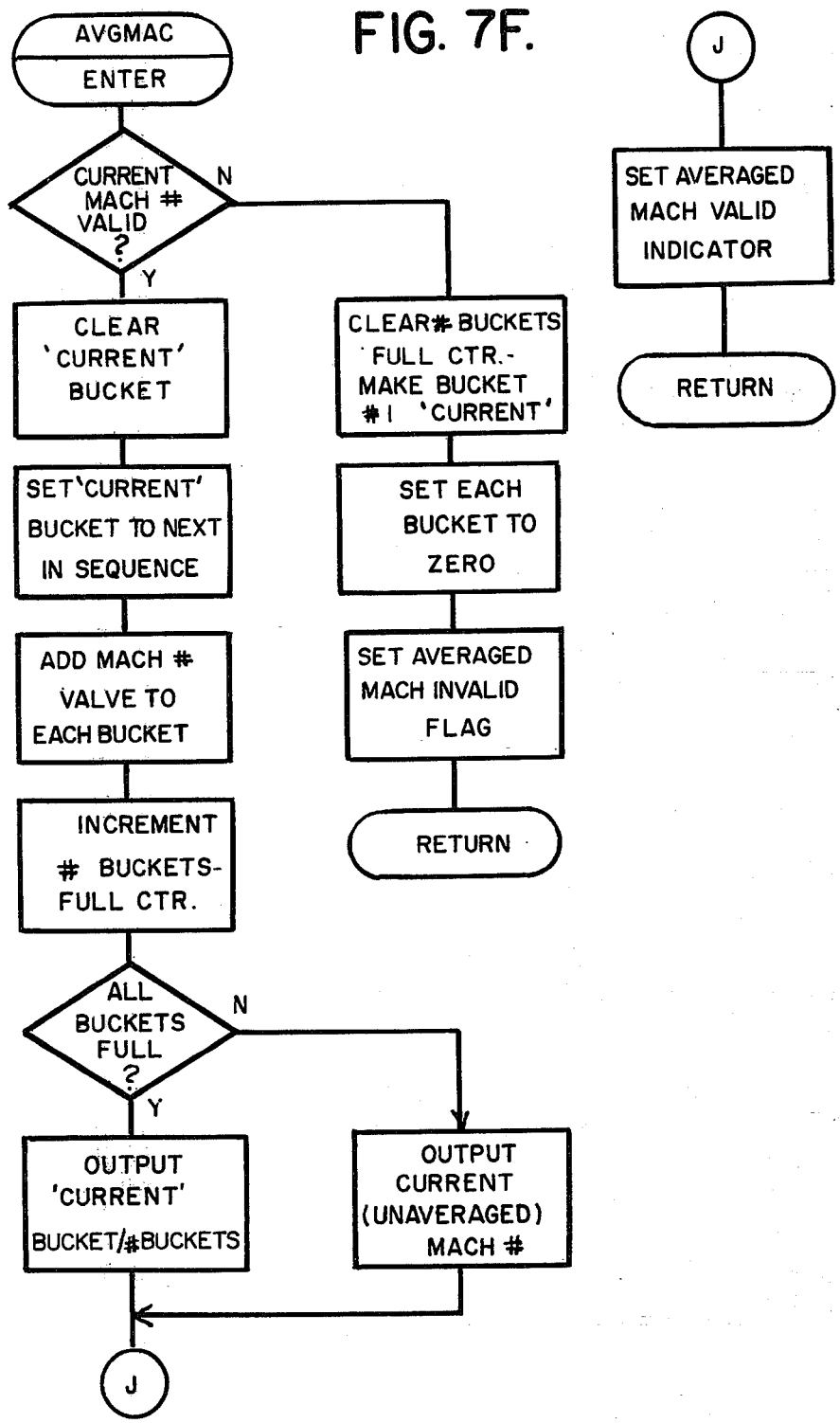
Figure 7G:
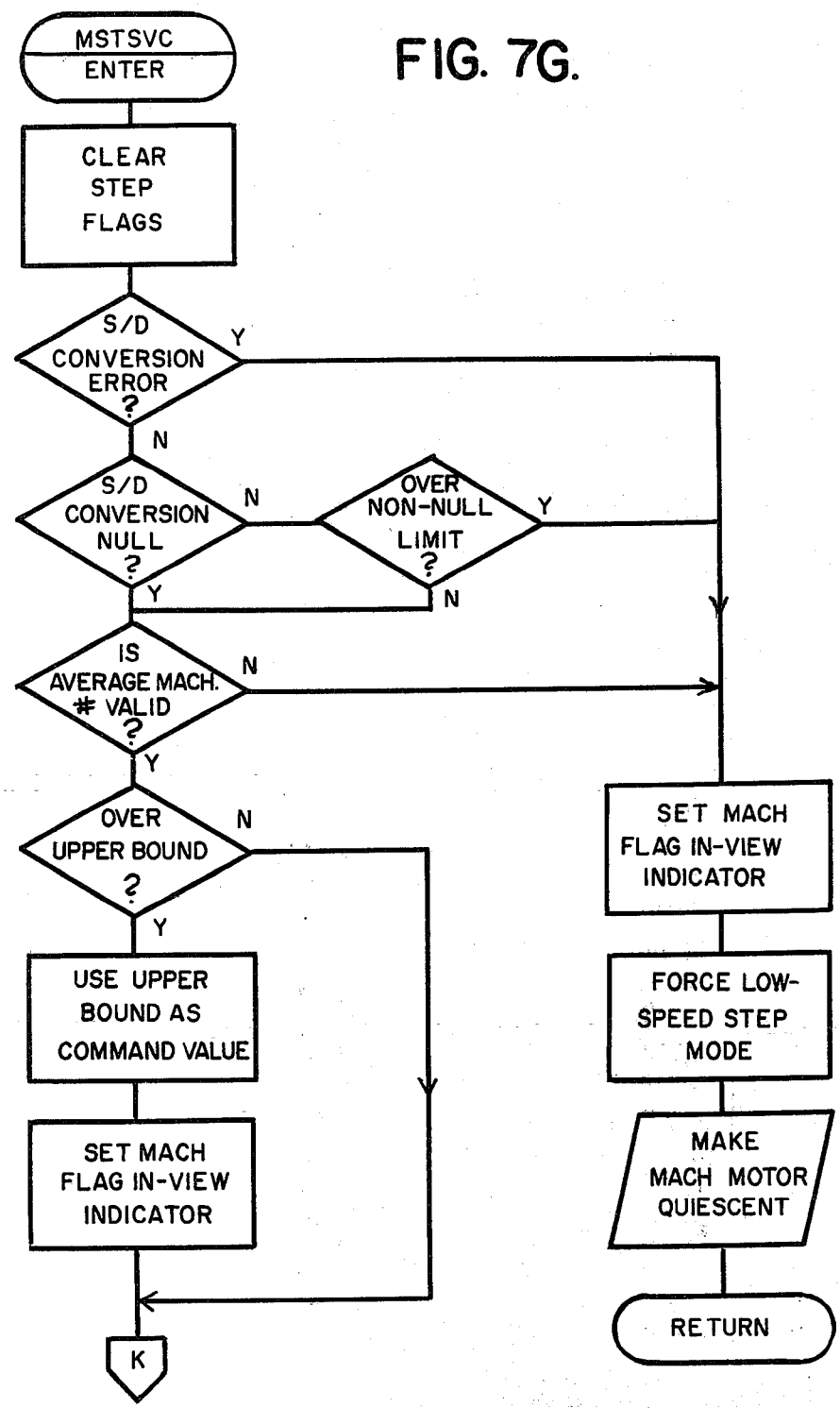
Figure 7H:
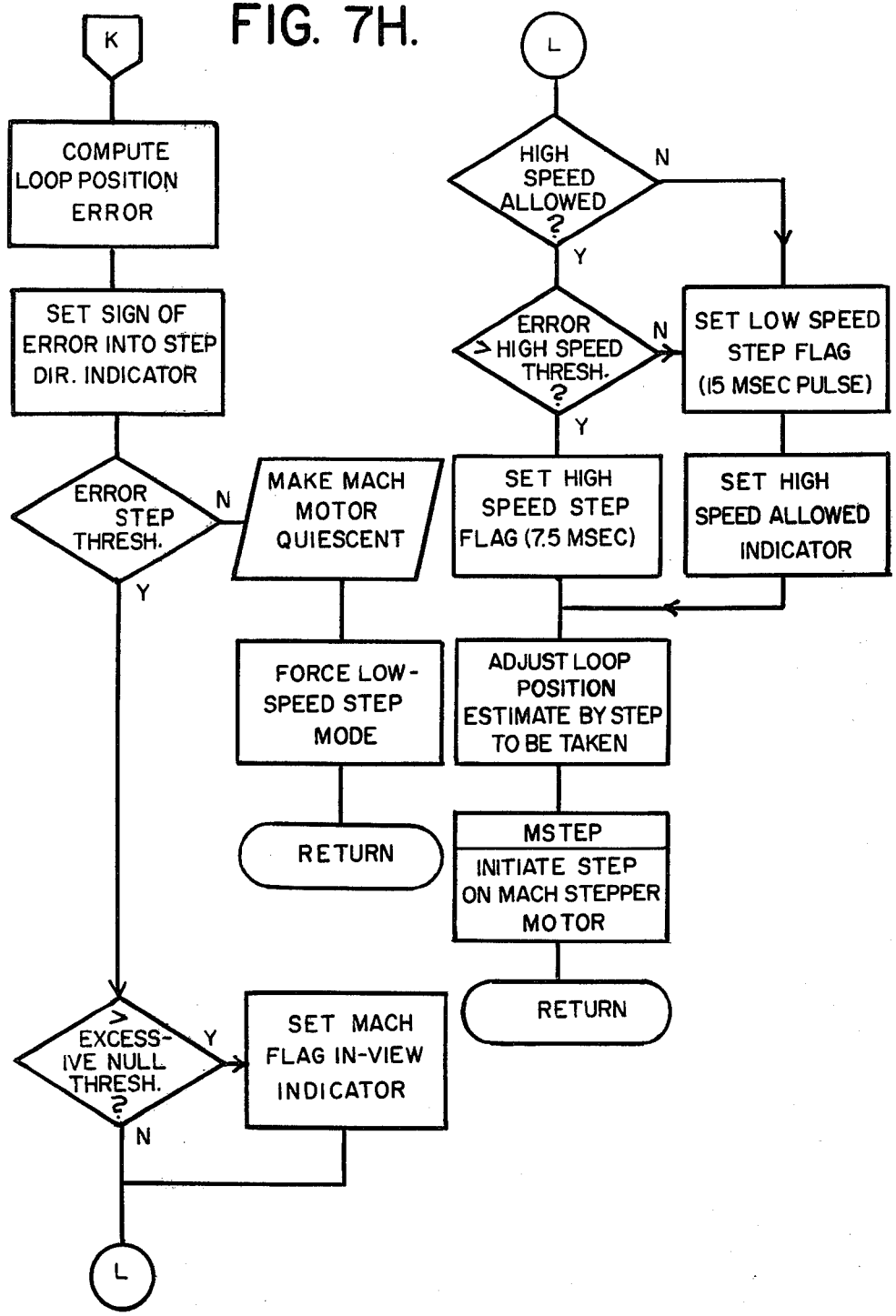
Figure 71:
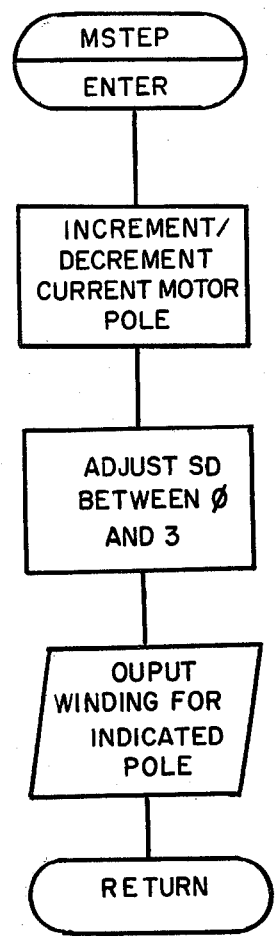
Figure 7J:
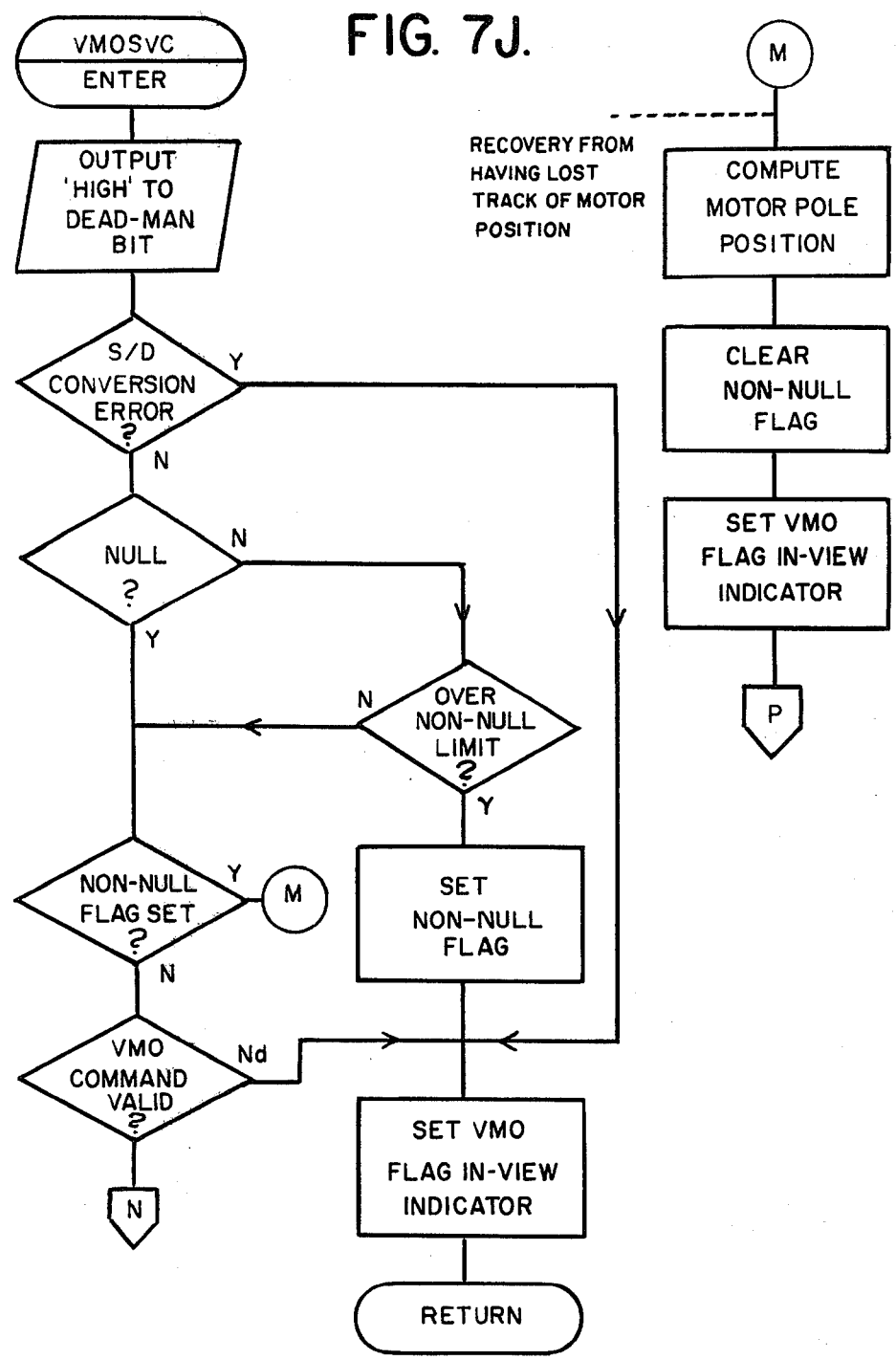
Figure 7K:
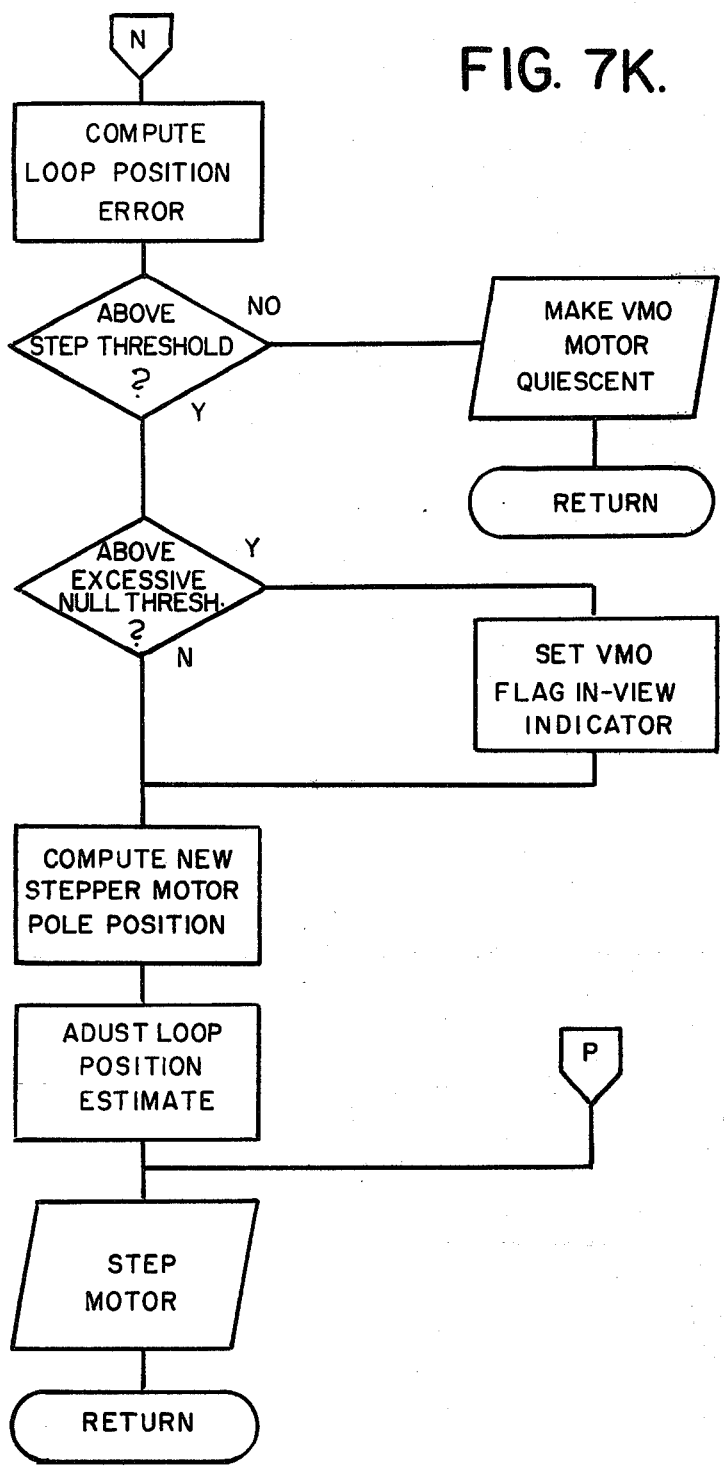
Figure 7L:
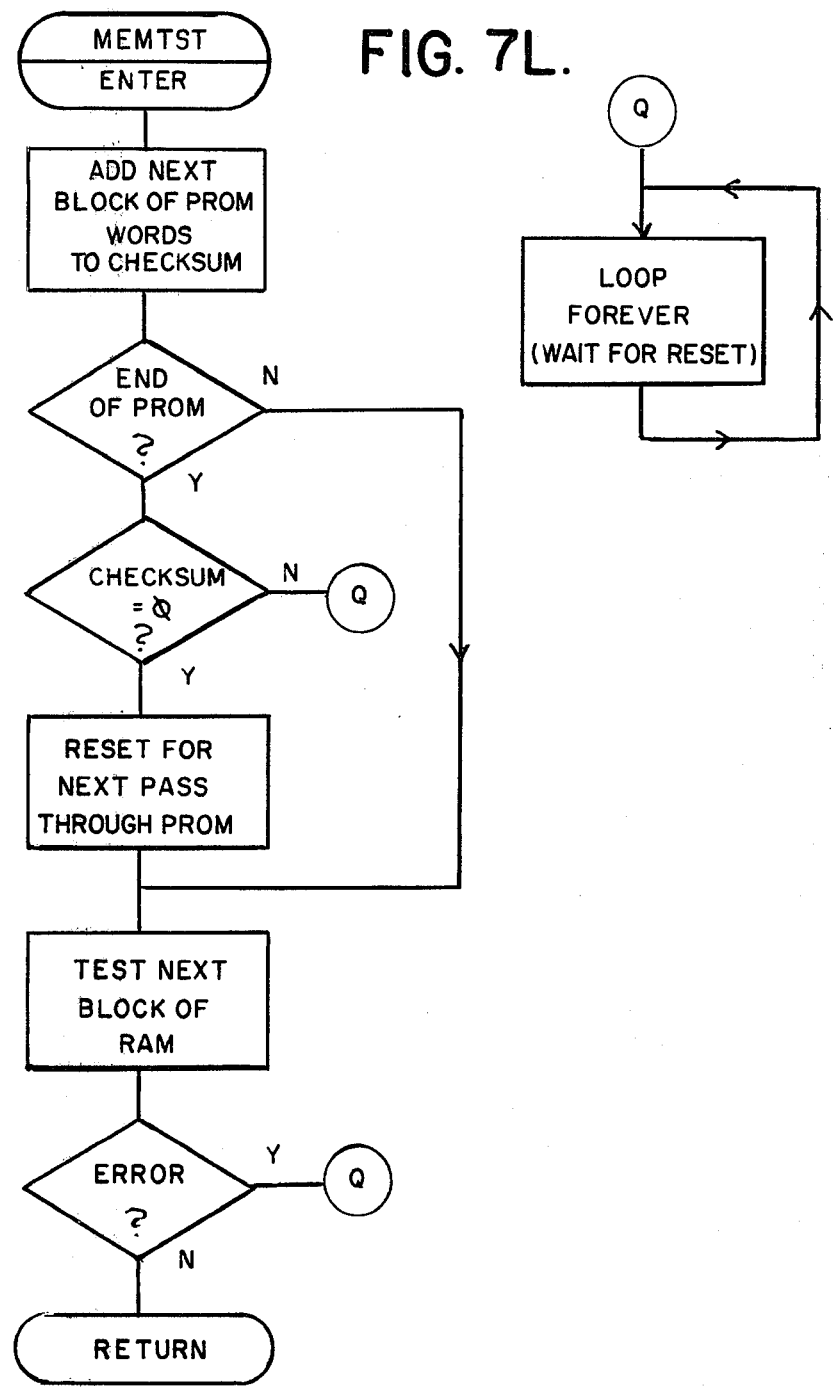
Figure 7M:
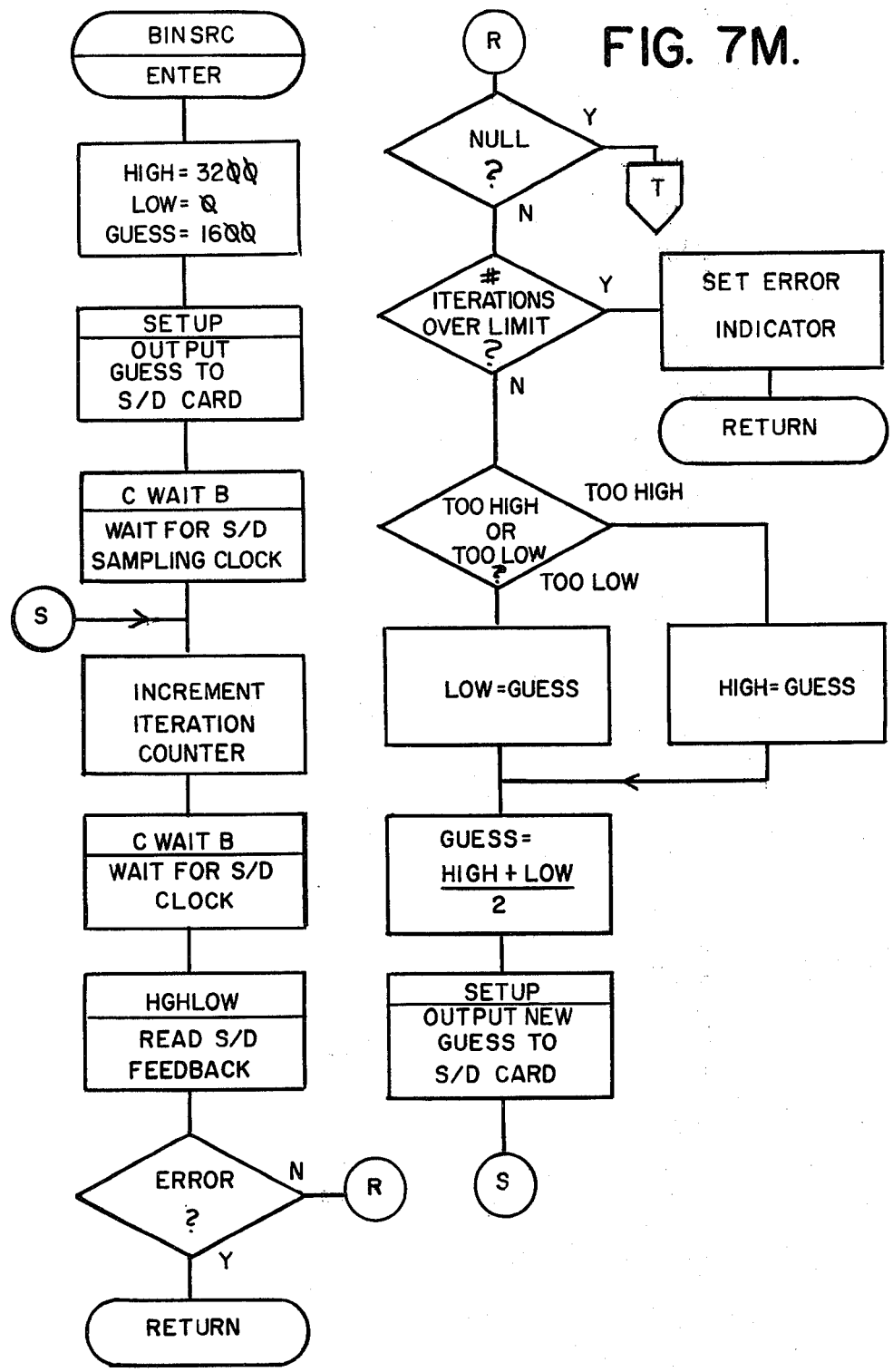
Figure 70:
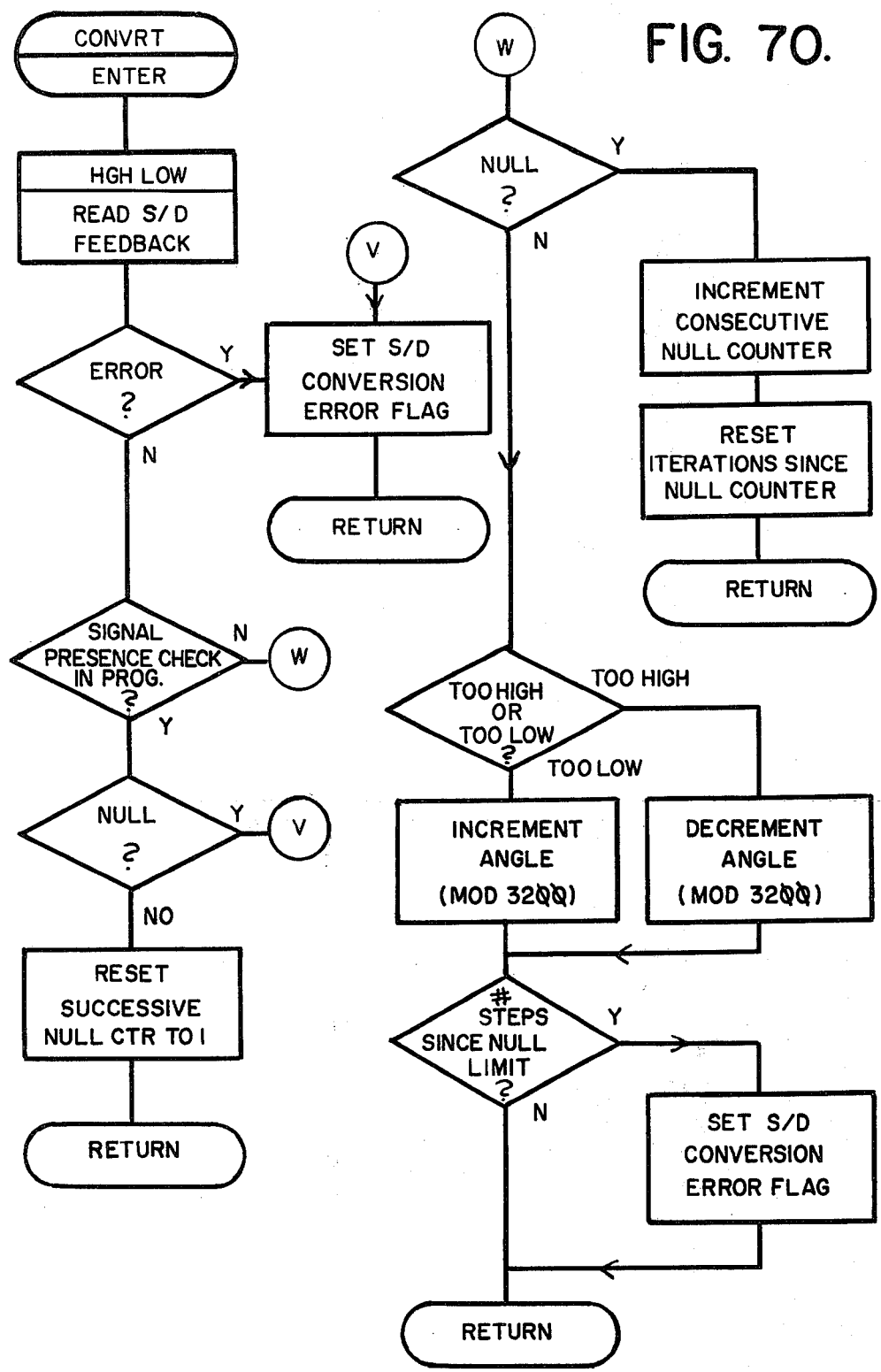
Figure 7P:
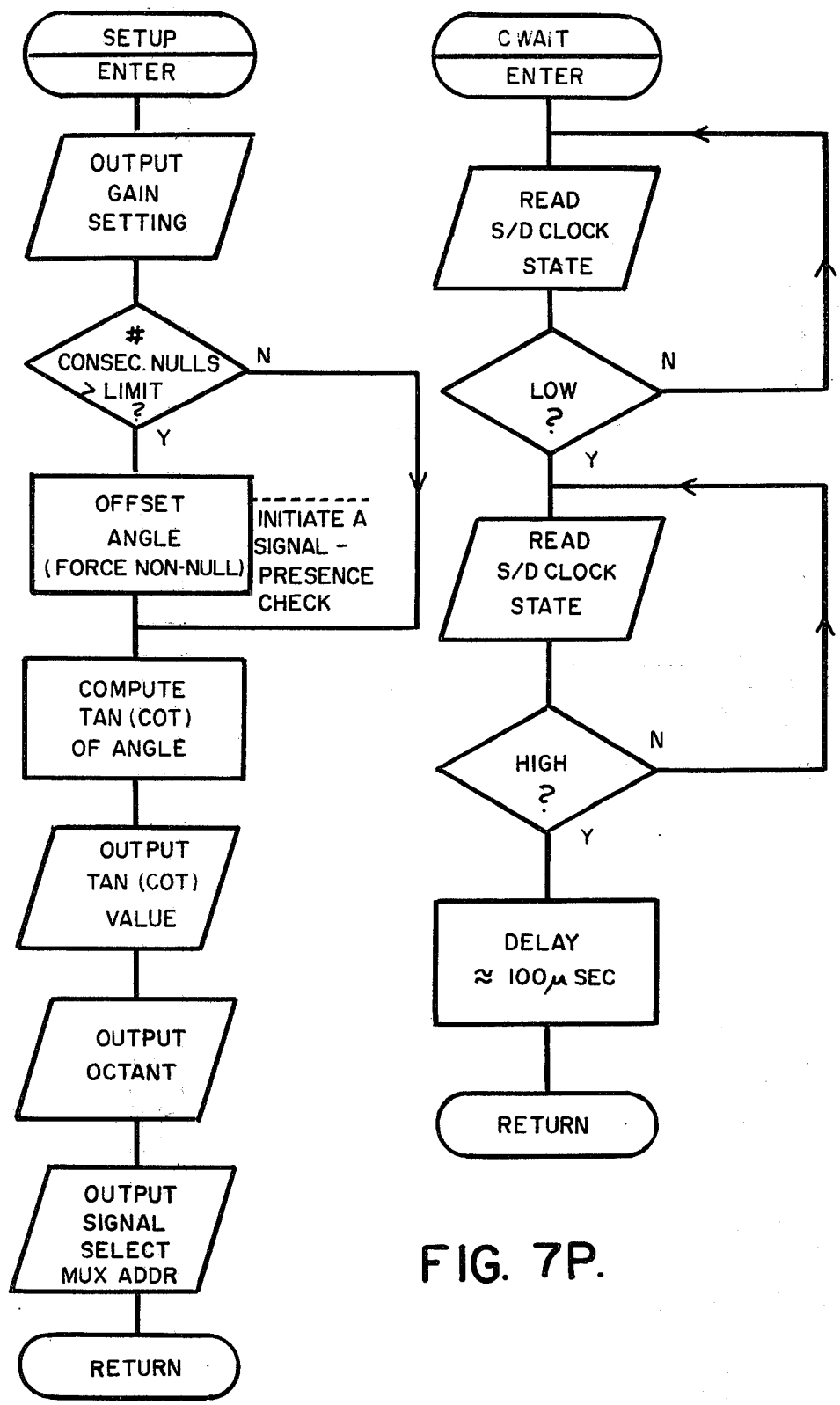
Figure 7Q:
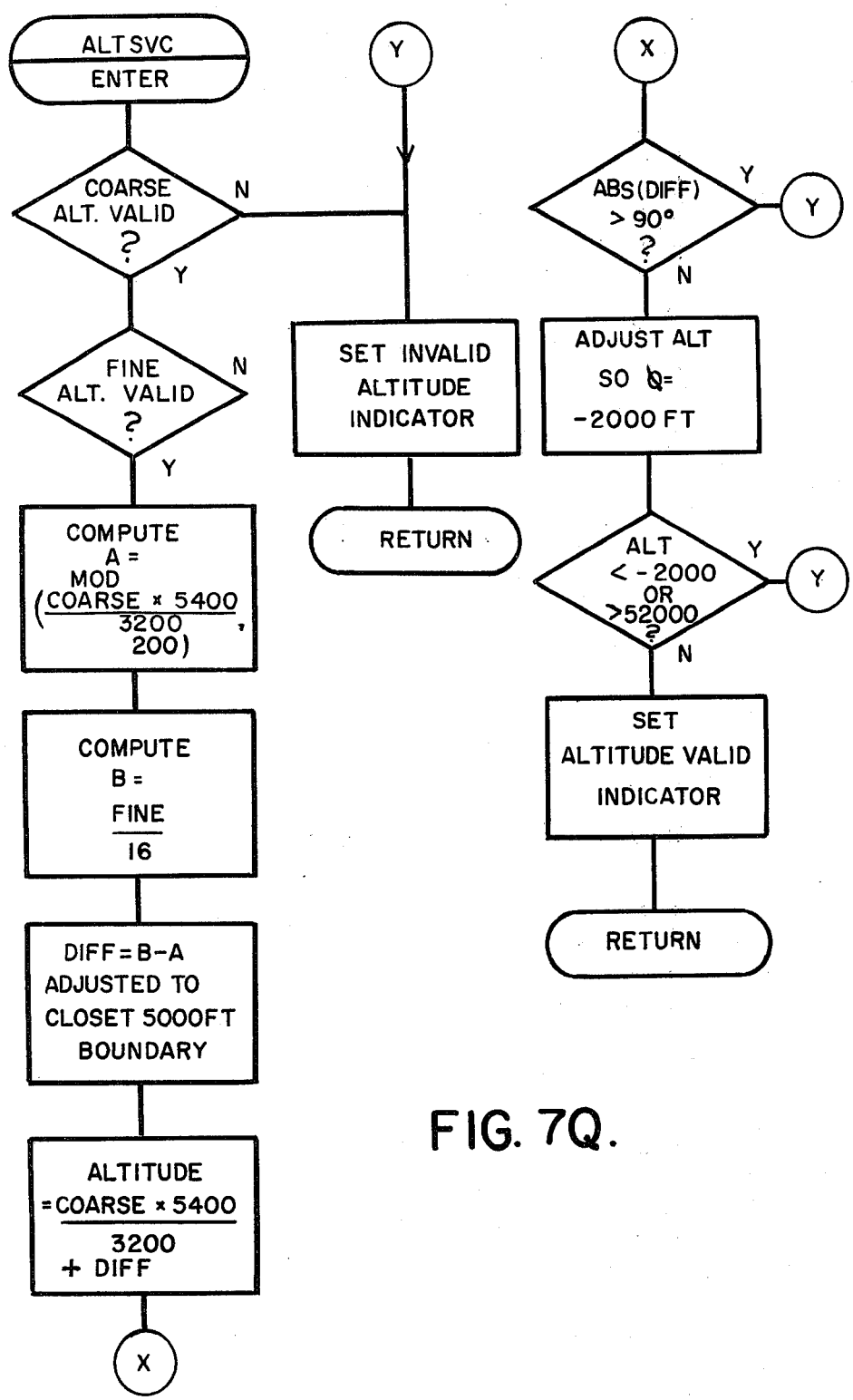
Figure 7R:
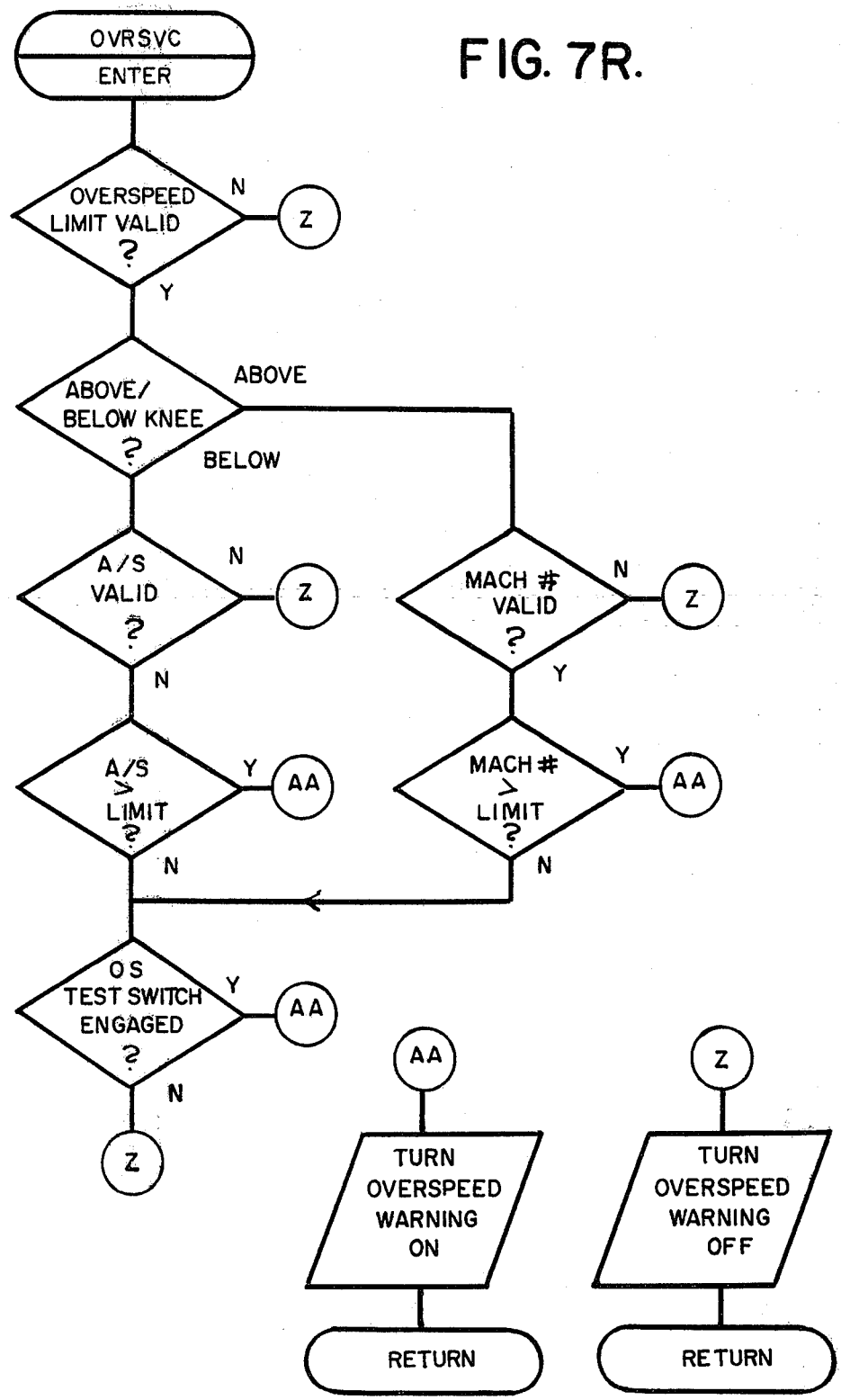
Figure 7S:
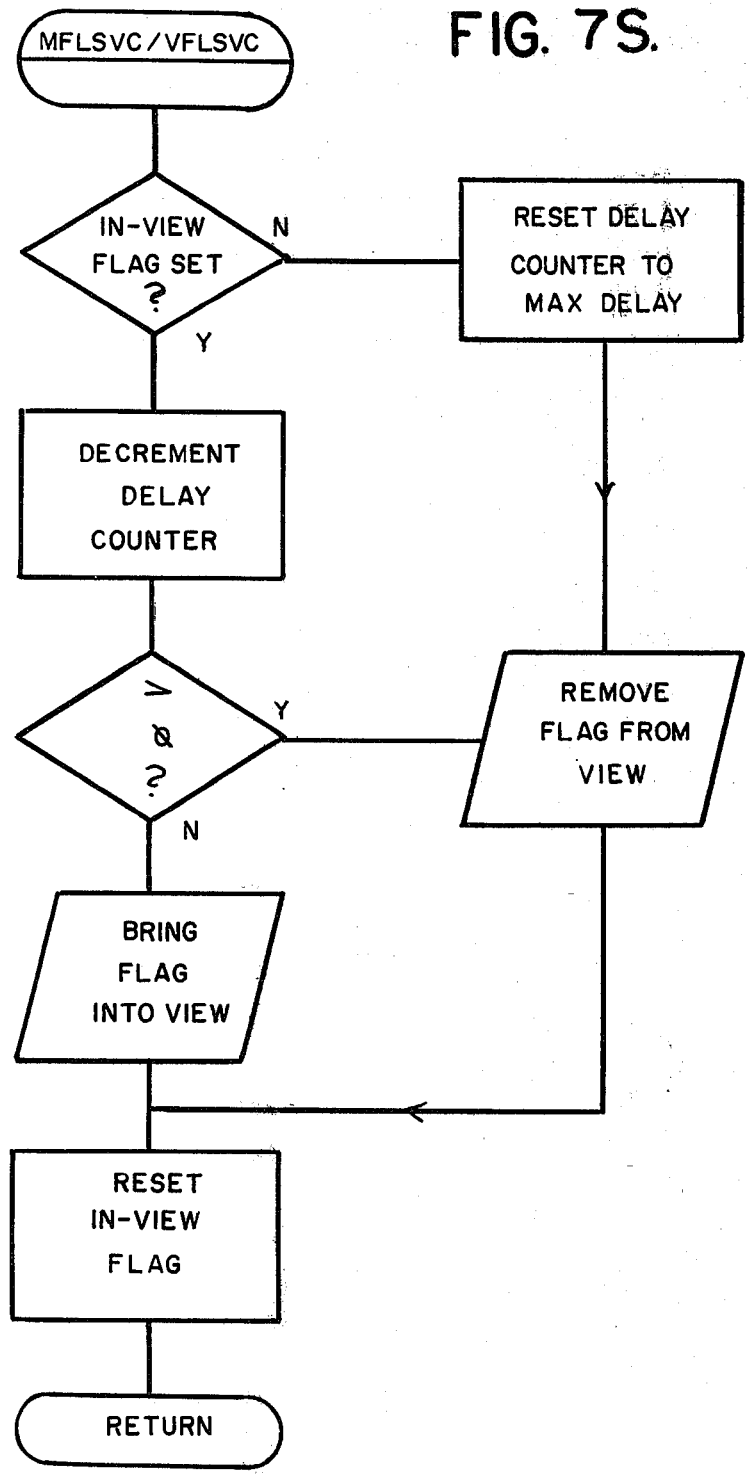
Figure 7T:
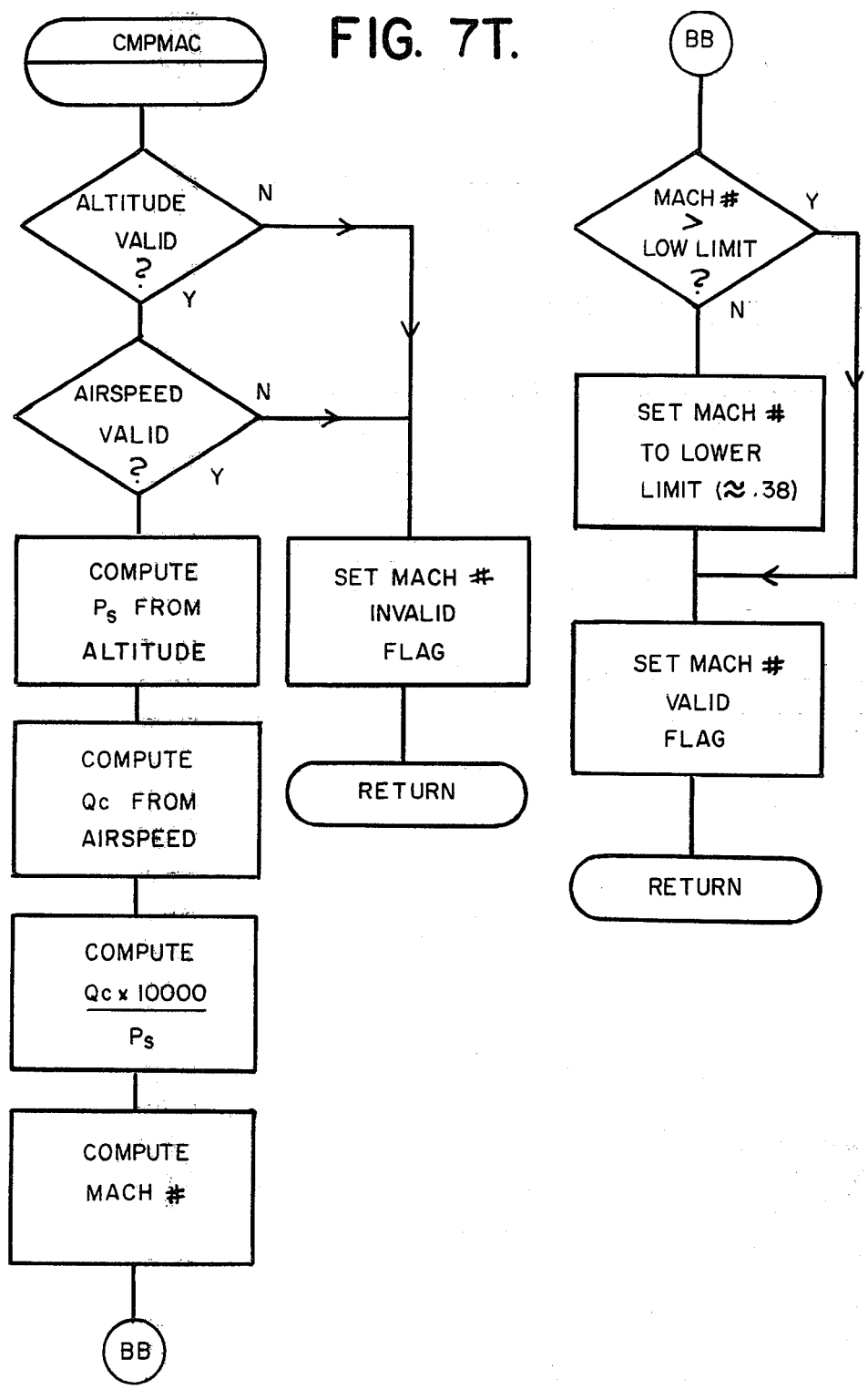
Figure 7U:
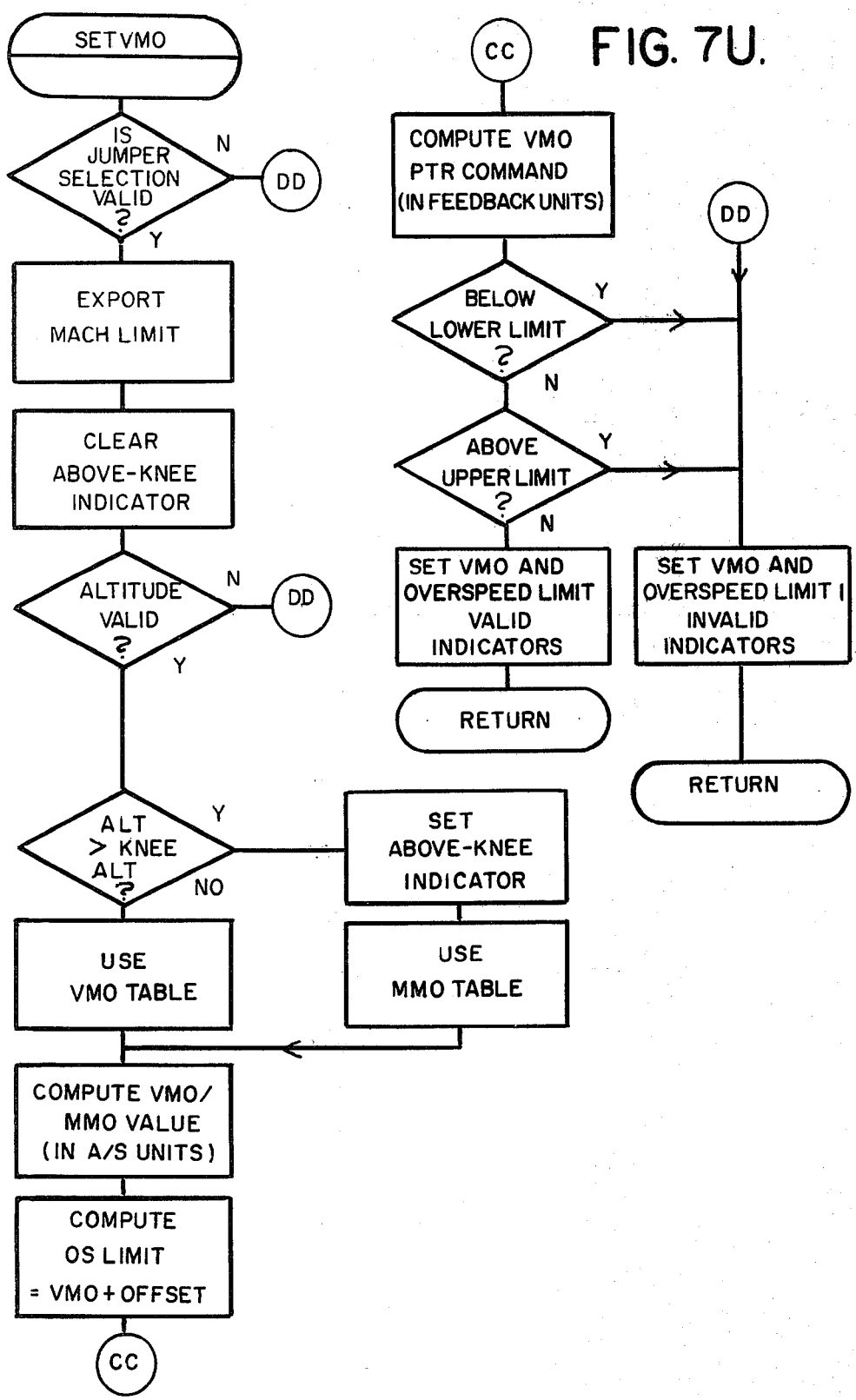
Figure 7V:
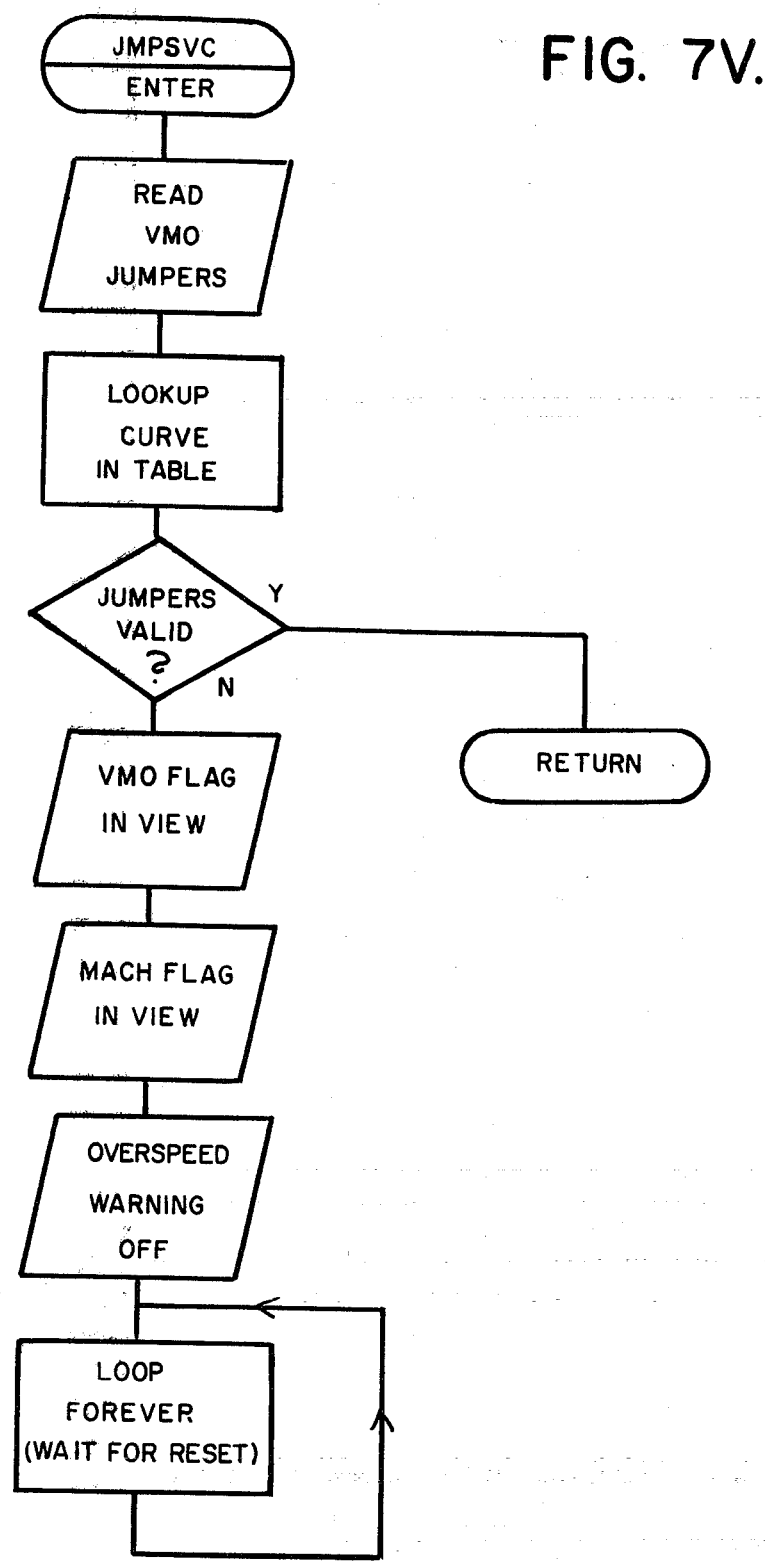

Referring now to the figures in detail, and initially to FIGS. 1, 6A and 6B, a mach air speed indicator, generally referred to by reference numeral 20, in accordance with the present invention is shown. FIG. 1 is a functional block diagram of the preferred mach air speed indicator 20 of the present invention. FIGS. 6A and 6B are front elevations of the face plate of the mach air speed indicator 20, with FIG. 6B being a partial view of the arrangement illustrated in FIG. 6A with the failure flags in position, as will be described in greater detail hereinafter.

Referring now to FIG. 1, it is assumed that the mach air speed indicator 20 of the present invention is employed on a conventional aircraft, such as Boeing 727, which normally has an on-board central analog air data computer (CADC) which converts measured pressure to analog air speed and altitude signals. However, such an analog air data computer does not normally provide mach number or VMO which is the maximum operation velocity of the aircraft. As is well known, the VMO is a function of the airplane configuration and can be represented by a curve which represents the maximum allowable air speed as a function of altitude. There is normally a family of such VMO curves for a given aircraft, with the appropriate curve being dependent on various factors such as the external configuration of the aircraft, that is, by way of example, whether or not it will be flying with an extra engine in a "ferry engine mode", whether it will be flying with the landing gear down or whether it will be flying with a different fuel load capacity. Such VMO curves are well known in the art and have been mechanically defined in the past by particular cam configurations employed to mechanically drive a VMO pointer.

As will be described in greater detail hereinafter, the preferred mach air speed indicator 20 of the present invention receives analog air speed and altitude signals and internally computes VMO from electronically stored externally selectable VMO curves, internally computes mach number, displaying both the computed mach number and VMO for the aircraft, and provides a command air speed, such as indicated by a movable air speed bug 22. Air speed bug 22 may be selectively driven by an on-board performance data computer (PDC) to other computer to indicate to the flight crew the optimum air speed, such as for minimum fuel consumption, as well as selectively being manually settable.

As was previously mentioned, FIG. 1 is a functional block diagram of the preferred mach air speed indicator 20 of the present invention which enables the aforementioned functions to be achieved. As shown and preferred in FIG. 1, the mach air speed indicator 20 of the present invention includes conventional failure monitor circuits 24, 26 and 28, with failure monitor circuit 24 being associated with the air speed flag 30, with failure monitor circuit 26 being associated with the VMO flag 32 and mach flag 34, and with failure monitor circuit 28 being associated with the bug flag 36 and the manual flag 38. These respective flags 30, 32, 34, 36, 38 are illustrated in the display position in FIG. 6B which illustrates how they would appear to the pilot observing the face plate of the mach air speed indicator 20. These flags 30, 32, 34, 36, 38 are normally held out of view as is illustrated in FIG. 6A, with the display position for flags 32, 36, 38 being blank as illustrated in FIG. 6A, and with a two digit mach counter 40 being visible with mach flag 34 held out of the display position, and with a three digit air speed counter 42 being visible when the air speed flag 30 is held out of position. As is also shown in the display of FIGS. 6A and 6B, the mach air speed indicator 20 of the present invention also preferably includes a conventional air speed indicator dial 46 with the air speed being conventionally indicated in knots by the position of a rotating air speed pointer 48. In addition, the display illustrated in FIGS. 6A and 6B also includes a rotatable VMO pointer 50 for visually indicating the pertinent VMO to the pilot. A manual adjust knob 52 for manually setting the air speed bug 22 is also illustrated in FIG. 6A as being disposed, for example, on the front of the instrument 20 for easy access.

Failure monitor circuit 24, which controls the air speed flag 30, and which, in reality, is a conventional transistor switch and threshold detector, detects or monitors three different input signals provided via paths 60, 62, 64, respectively. The input signal provided via path 60 to failure monitor 24 is labeled "CAS VALID" which is a discrete valid 28 volt DC signal provided from the conventional on-board analog air data computer. The analog air data computer also provides a syncho signal via path 66 to a servo loop 68 for driving the air speed pointer 48 and counter 42. Servo loop 68 preferably includes a conventional DC servo motor 70 which is mechanically connected to both air speed counter 42 and air speed pointer 48 through a conventional clutch 72, and which is in turn mechanically connected in the servo loop to a conventional control difference resolver 74 which preferably accomplishes a single revolution for a full scale movement of the air speed pointer 48. In addition, the resolver 74 which is mechanically linked in a feedback path to the servo motor 70, has its output electrically connected to a conventional type of servo amplifier or driver 76 whose output is in turn connected in parallel to the input of servo motor 70 and, via path 64, to one input of the failure monitor circuit 24. The input of resolver 74 is electrically connected via path 66 to the on-board analog air data computer for receiving the air speed synchro signal therefrom. As also shown and preferred in FIG. 1, driver circuit 76, which is shown in greater detail in FIG. 5, also receives as an input the output of a conventional type of anti-ambiguity circuit 78 which is also shown in greater detail in FIG. 5. The purpose of anti-ambiguity circuit 78 is to override the resolver 74 output signal when the instrument 20 approaches the mechanical stops for the pointer 48 and thereafter drive air speed pointer 48 in the reverse direction for greater than 180° of rotation and, thereafter, return command of the servo motor 70 to the resolver 74. As was previously mentioned, this type of operation is conventional and well known in the art. In addition to the electrical connection of resolver 74 to driver 76, its output is also connected, via path 62, to the input of failure monitor circuit 24 whose output controls the air speed flag 30 which is held out of view by conventional electromagnet 80. Thus, in conventional fashion, failure monitor circuit 24 monitors servo null, valid air speed, signal presence, and as represented by path 82, monitors the power supply.

As was previously mentioned, servo motor 70 is mechanically connected to both the air speed counter 42 and the air speed pointer 48. As shown and preferred in FIG. 1, this mechanical connection to the air speed pointer 48 is accomplished through a conventional dial non-linearity cam 84 which compensates for non-linearities in the display scale associated with pointer 48, and which is mechanically connected to pointer 48 through conventional differential gearing 86 which is also mechanically linked to the gearing associated with counter 42 so as to enable both the counter 42 and pointer 48 to be synchronously driven. In addition, as also shown and preferred in FIG. 1, the mechanical connection of the servo motor 70 to both the counter 42 and pointer 48 is also mechanically connected through a conventional gear train 88 to the wiper arm of a potentiometer 90 whose output is electrically fed back to the input of anti-ambiguity circuit 78. Furthermore, the mechanical output of differential gearing 86 which is connected to pointer 48, is also mechanically connected through another conventional gear train 92 to a conventional synchro transmitter 94 which also receives, as an electrical input thereto, a power excitation signal, via path 96 which signal is representation of switchable power to engage the auto-throttle servo control loop when the auto-throttle is engaged by the pilot. In other words, this power excitation signal is present only when auto-throttle has been engaged by the pilot. The output of synchro transmitter 94 is electrically connected via path 98 to a conventional synchro control transformer or receiver 100 whose output is a voltage proportional to the difference between the angle of synchro transmitter 94 and the angle of synchro transformer 100. This output signal is the auto-throttle output signal, or speed command signal, provided via path 102 to the conventional auto-throttle circuitry on board an aircraft such as the Boeing 727.

Synchro control transformer 100 is also mechanically linked through a conventional gear train 104 to the air speed bug 22 control circuit which includes a servo loop 106 for driving the air speed bug 22 to the optimum speed position. Servo loop 106 preferably includes a conventional DC servo motor 108 whose output is mechanically connected to the air speed bug 22 and to the synchro control transformer 100 through a conventional clutch 110. A manual control gear 112, to be described in greater detail hereinafter, is also mechanically connected to the air speed bug 22 for selectively enabling manual setting or control thereof. As also shown and preferred in FIG. 1, the output of DC servo motor 108 is mechanically connected to the wiper arm 116 of a potentiometer 118 which, for example, receives its reference signals from a conventional on-board performance data computer, such as a PDNCS manufactured by Lear Siegler, and whose output is connected as one input to a conventional two input servo amplifier 120 shown in greater detail in FIG. 5. The output input to servo amplifier 120 is the command air speed cursor input provided from the onboard conventional performance data computer which conventionally provides the ideal air speed for minimum fuel consumption for the aircraft.

The output of servo amplifier 120 is electrically connected in parallel to the input of DC servo motor 108 and to the failure monitor 28, which is also a conventional transistor switch and threshold detector similar to failure monitor 24 and detects servo null via this connection. The other input to failure monitor 28 is the "PDC VALID" signal which is a discrete signal from the performance data computer. In addition, the other input to failure monitor 28 is from the conventional power supply 122 which converts aircraft power to DC. Thus, failure monitor 28 monitors servo null, valid PDC signal and power supply and trips the bug flag 36 when appropriate.

With respect to the manual control of air speed bug 22, this is accomplished by manual adjust knob 52 which is mechanically connected to a drive gear 130. Drive gear 130, which is connected to manual adjust knob 52 via a conventional clutch 132, is selectively engageable in driving engagement with gear 112 when manual adjust knob 52 is pulled out. In order to alert the pilot that the manual adjust knob 52 has been pulled out, as shown and preferred in FIG. 1, gear 130 is also preferably mechanically connected to a switch 134 which is moved to the dotted line position shown in FIG. 1 when manual adjust knob 52 is pulled out. This disables the DC servo motor 108 and energizes the manual flag 38 into view while keeping the bug flag 36 out of view in the display of instrument 20. The bug flag 36 and manual flag 38 circuitry associated with failure monitor 28 also preferably includes a diode 136 whose purpose is to prevent operation of the manual flag 38 by the failure monitor 28, with such manual flag 38 operation solely resulting from the manual adjust knob 52 being pulled out. Thus, as previously stated, failure monitor 28 only trips the bug flag 36. As also shown and preferred, manual adjust knob 52 is mechanically connected to a manual mode transistor switch 140 which is a status information switch connected to the auto-throttle to provide a signal to the auto-throttle that the air speed bug 22 control, which is the desired air speed setting, is in the manual mode.

Figure 2:
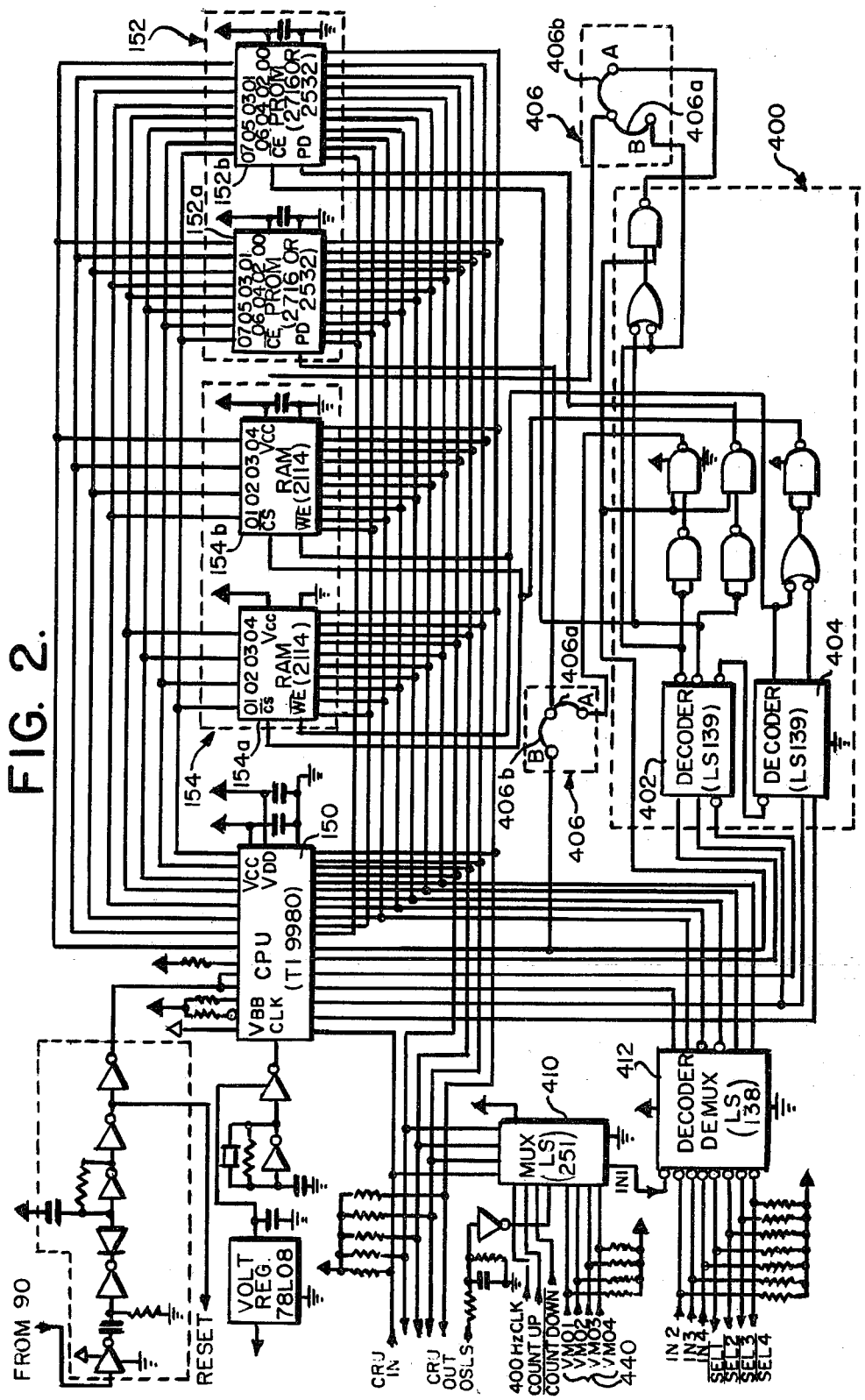
FIG. 2 is a schematic diagram, partially in block, of the microprocessor control portion of the mach airspeed indicator of FIG. 1.

Now referring to control of the VMO flag 32, VMO pointer 50, mach flag 34 and mach counter 40, these are preferably controlled by an internal microprocessor or central processing unit 150, such as a TI9980 shown in greater detail in FIG. 2, which calculates the mach number and VMO from the measured analog air speed and altitude signal information provided from the on-board analog air data computer and provides a display of VMO via VMO pointer 50 and a display of mach number via mach counter 40. Central processing unit 150 preferably has a conventional associated read-only-memory 152 and random-access-memory 154 which are also shown in greater detail in FIG. 2 as forming part of the conventional TI9980 microprocessor configuration as is also true for the conventional input buffers 156 and output buffers 158. Input buffers 156 preferably receive the valid air speed signal via parallel path 60, the "altitude valid" signal via path 160, and the program select signal for the appropriate VMO curve from a programming switch via path 162. The "altitude valid" signal, as is true for the "air speed valid" signal, is provided from the on-board analog air data computer. The output of the input buffers 156 is provided to one input of the central processing unit 150 whose other inputs are the output of failure monitor 26, which is a conventional central processing unit failure monitor, and the output of synchro-to-digital converter 164 which will be described in greater detail hereinafter with reference to FIG. 3.

The input to synchro-to-digital converter 164 is the output of a conventional synchro MUX 166 which, as shown and preferred, receives five input signals which it multiplexes. One of these five input signals is the analog altitude synchro signal provided from the on-board analog air data computer via path 168. In addition to the signal provided via path 168, the synchro MUX 166 also receives the measured coarse altitude and fine altitude actual signals from the analog air data computer via paths 170 and 172. The other two input signals to synchro MUX 166 are servo feedback signals provided from the VMO servo loop 174 via path 176 and from the mach servo loop 178 provided via path 180.

With respect to the VMO servo loop 174, this servo loop 174 is preferably closed by the central processing unit 150 which calculates the VMO based on the selected VMO curve and the actual altitude of the aircraft. In addition to central processing unit 150, the servo loop 174 also preferably includes a conventional resolver transmitter 182 whose input is mechanically linked to a stepper servo motor 184 to be described in greater detail hereinafter with reference to FIG. 4, and whose output is electrically connected via path 176 to the synchro MUX 166 and, therefrom, through synchro-to-digital converter 164 to the central processing unit 150. The output of stepper servo motor 184 is also preferably mechanically connected to drive the VMO pointer 50, with stepper servo motor 184 permitting computer controlled incremental movement of the pointer 50 while preferably consuming no power when pointer 50 is not being driven. Stepper servo motor 184 is preferably driven by a conventional type of stepper motor servo driver 186 shown in greater detail in FIG. 5 whose input is provided from the central processing unit 150 via output buffer 158 to close the loop 174. Servo amplifier or driver 186 is also connected to the VMO flag 32 so as to trip the flag 32 when the VMO signal is not being provided. Central processing unit 150, via output buffer 158, is also connected to an overspeed transistor switch 190 which provides an arming signal to an alarm (not shown) if the desired VMO is exceeded.

Similarly, mach servo loop 178 also preferably includes a stepper servo motor 194, preferably identical in operation to stepper servo motor 184, which is mechanically connected to the mach counter 40 and to a conventional resolver transmitter 192 whose output is electrically fed back via path 180 to the synchro MUX 166 and, therefrom, through the synchro-to-digital converter 164 to the central processing unit 150. The stepper servo motor 194 is incrementally driven by the central processing unit 150 via output buffer 158 and a conventional type of stepper motor servo driver amplifer 196, shown in greater detail in FIG. The output of driver 196 is also connected to the mach flag 34 for tripping this flag 34 if no mach signal is present. Thus, both the mach flag 34 and the VMO flag 32 are held out of view by their associated electromagnets 200 and 202, respectively, if the VMO signal and the mach signal are present. It should be noted that, for purposes of illustration, electrical connections are shown in FIG. 1 by solid lines and mechanical connections by dotted lines.

As was described above, the altitude input to the presently preferred mach air speed indicator 20 is in a coarse/fine synchro format. By way of example, the fine synchro preferably has a scale factor of 5000 feet per 360° of revolution and is cyclic every 5000 feet. Thus, this fine synchro signal is used as a high precision vernier such that the angular accuracies in the transmitting synchro have as little contributive error to the atitude accuracy as possible. Accordingly, since the synchro is cyclic every 5000 feet, by way of example, a coarse measurement signal is then required to determine the rough magnitude of the altitude signal. This coarse signal is preferably scaled, by way of example, at 135,000 feet per 360° of revolution and, accordingly, the accuracy of the coarse synchro is not required to be as high since it must merely define the altitude within less than 180° of the fine synchro which, in the example given, is within less than 2,500 feet. In conventional altimeters the industry standard for accuracy of such a coarse synchro is $\frac{1}{4}$° accuracy or approximately 175 feet. However, in practice, since this synchro accuracy is not required and there is a considerable amount of prior art equipment which was produced prior to the industry standard of $\frac{1}{2}$° accuracy, there are many prior art systems operating with as much as 2° **error of the coarse synchro signal relative to the fine synchro yielding a 750 foot difference in altitude definition between the coarse and fine synchro in the above example. This degree of error is taken into account in the synchro-to-digital converter 164 of the present invention shown in greater detail in FIG. 3.

Since the mach air speed indicator 20 of the present invention normally operates in a real time environment, a high accuracy conversion on the coarse synchro would be a very time consuming task and would reduce the availability of system power for other computation. Thus, preferably at initialization, both the coarse and the fine are converted and an altitude word is stored in the central processing unit 150. The coarse conversion is then accomplished by reducing the gain sensitivity of the synchro-to-digital converter 164 by a magnitude of preferably 16:1. As shown and preferred in FIG. 3, this is preferably accomplished by the central processing unit 150 turning on a conventional analog switch 220 which shunts a summing amplifier resistor 222 associated with a summing amplifier 224 with resistor 226 having associated values so as to reduce the gain of summing amplifier 224 by a factor of 16:1. It is the output of this summing amplifier 224 which is provided to the input of central processing unit 150. The coarse conversion then proceeds by stepping through the approximation table stored in the processor 150 in increments of 16 steps at a time until a null is achieved and the count-up and count-down signals are both off. The central processing unit 150 then converts the fine synchro signal using the coarse conversation as a rough location of altitude and zeros in on an exact binary representation of altitude utilizing the fine synchro signal to increment the altitude word in single bit steps.

Once an altitude word is accurately defined, the incoming altitude is tracked by continual tracking conversion using the high gain mode of the summing amplifier, that is with switch 220 off, with a periodic check of the coarse synchro by using the altitude word in the processor memory 152 as a guess at the proper angle of the coarse input signal in the reduced gain mode. In this reduced gain mode, should the coarse synchro signal be in error by less than, for example, 1,000 feet, the reduced gain of the summing amplifier 224 prevents the threshhold detectors from detecting an error and, therefore, feeding back to the processor 150, a satisfied or null condition. However, should the input signal be varied by more than 1,000 feet or by 5,000 feet which could cause a cyclic error in the fine synchro, the reduced gain mode would detect this error in the stored altitude word of the processor 150 and cause the processor 150 to track to null the coarse synchro and locate the altitude within less than 1,000 feet, thereafter again allowing the fine synchro to fine tune the altitude word. This preferred arrangement permits low overhead conversion of a two speed synchro system since, under normal conditions, the coarse synchro would always be at null and the "guess" of the processor 150 will always be correct requiring only a periodic check under a low gain condition of a satisfactory angular approximation. Moreover, if after a selected number of steps in the fine synchro conversion, no null is achieved in the solid state servo loop, through conventional programming the increment magnitude may be increased so that in a real time mode the rate at which the converter 164 tracks the signal is increased by a predetermined magnitude in order to enable the servo to be nulled at this higher incrementing rate. Thereafter, when null is achieved, the system will automatically switch back to the fine or lower speed incrementing rate. This enables the converter 164 to track high signal rates at a fixed synchronous sampling rate without a reduction in accuracy.

Figure 3:
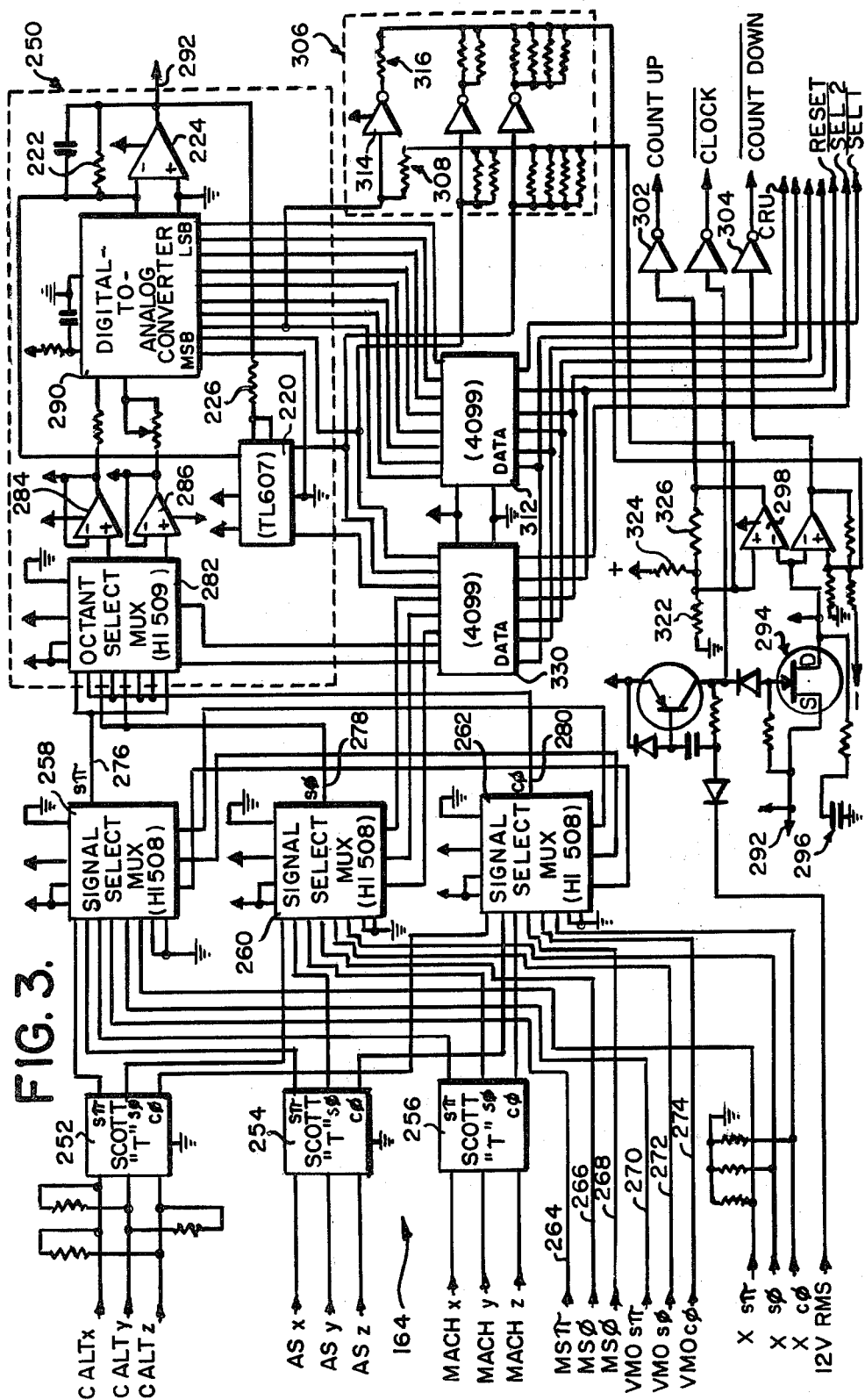
FIG. 3 is a schematic diagram, partially in block, of the preferred synchro-to-digital converter portion of the mach airspeed indicator of FIG. 1.

FIG. 3 represents the presently preferred synchro-to-digital converter 164 and its associated circuitry with the actual converter and threshhold detectors being generally represented by reference numeral 250. As is shown and preferred in FIG. 3, synchro signals are fed into conventional Scott "T" transformers 252, 254 and 256 which convert the synchro signals to resolvers signals with center tapped outputs which result in 0° and 180° phase for the plus or minus sine and cosine signals required in the subsequent synchro-to-digital conversion. The output of these transformers 252, 254, 256 is preferably fed to conventional multiplexers 258, 260, 262 which are used to select the signals from the three Scott "T" transformers 252, 254, 256 and direct the resolver inputs for mach provided via paths 264, 266, 268 and for VMO provided via paths 270, 272, 274. Thus, the synchro-to-digital converter 164 may be referred to as a multichannel multiplexing synchro-to-digital converter, although the principles thereof apply in the absence of such multiplexing. The three signals used in the aforementioned synchro-to-digital conversion are the sine, 180° out of phase, which is provided as the output of multiplexer 258 via path 276, the in-phase sine output of multiplexer 260 provided via path 278 and the in-phase cosine output of multiplexer 262 provided via path 280. These three output signals are preferably fed to the input of another conventional multiplexer 282 which preferably accomplishes octant selection and feeds the appropriate signals through buffer amplifiers 284 and 286 to the input of conventional digital-to-analog converter 290. The output of digital-to-analog converter 290 is preferably fed into the summing junction of the operational amplifier 224 which functions as a summing amplifier. Preferably, the internal MOS switches in the digital-to-analog converter 290 which sense the currents from the ladder network to ground are grounded. The resultant error signal output of summing amplifier 224 is then preferably fed, via path 292, through a peak sampling demodulator consisting of field effect transistor 294 and capacitor 296. The count-up and count-down signals are provided via operational amplifiers 298 and 300 which function as threshhold detectors and provide the count-up and count-down signals, respectively, through buffers 302 and 304, respectively.

The converter 164 sensitivity can be reduced by the preferred 16:1 magnitude through the use of analog switch 220, as was previously mentioned, which shunts feedback resistor 222 with resistor 226 thereby reducing the gain of summing amplifier 224 by the preferred 16:1 ratio which is preferably employed in the presently preferred mach air speed indicator 20 when the coarse altitude indicator signal is converted. This is preferably done, as previously mentioned, since only crude conversion accuracy is required for the coarse altitude input signal and, therefore, by incrementing the addresses 16 times as fast, the speed of conversion is similarly increased without an effective loss in accuracy since such accuracy is not required with respect to the coarse synchro conversion. This crude digital-to-analog conversion network preferably includes resistor ladder networks 308 and 310 which are driven by a 0 volt or 5 volt signal, by way of example, from chip 312 or inverted through buffer amplifier 314, respectively. Since chip 312 and inverter 314 are preferably CMOS devices they provide an accurate plus power supply voltage which is preferably normally 5 volts and ground. Thus, in the case of resistor ladder network 308, when the three most significant bits to digital-to-analog converter 290 are high, they preferably add to the threshhold at the junction 320 of resistors 322, 324, 326 by summing in plus 5 volts, by way of example, through the resistor networks. Similarly, with a voltage fed through resistor ladder network 310, when the most significant bits to digital-to-analog converter 290 are high, the inverters cause pins 2, 4, 6 of chip 314 to be low adding no positive voltage to the minus threshhold causing the minus threshhold to be the largest magnitude. Around 0° the three most significant bits are all 0, thus causing the voltage at the input of resistor ladder network 308 to be 0 which adds no voltage to the positive threshhold and through inverter 314 adds a positive voltage to the negative threshhold thereby reducing it and causing the net threshhold of the converter 164 to be the smallest or narrowest window to compensate for the reduced error signal sensitivity around 0. It should be noted that chip 312 is preferably identical in function and operation to chip 330, which are both conventional 4099 integrated circuit chips.

Thus, as described above, a single multiplying digital-to-analog converter is preferably used to accomplish synchro-to-digital conversion which therefore only requires half the component count and half the amount of digital address lines as compared with what would be required if two separate multiplying digital-to-analog converters were required to accomplish the synchro-todigital conversion. Thus, the presently preferred synchro-to-digital converter 164 employing only a single digital-to-analog converter 290 preferably consists of a binary scale R2R resistor ladder network feeding a MOS transistor switch arrangement as described above. The reference signal is fed to the input of this ladder network and the currents flowing through the 10 R2R resistors preferably comprising this ladder network are fed to the node of two field effect transistors switching that current either to ground or to the summing junction of operational amplifier 224 which is held at virtual ground through its feedback resistor. Accordingly, the single digital-to-analog converter 290 is preferably addressed with a binary signal scaled as a function of the tangent and cotangent angle $\epsilon$ with the equation that is solved being $\cosin \theta \times \tangent \alpha - \sin \alpha = 0$ if $\theta$ and $\alpha$ are equal. The output voltage from the digital-to-analog converter 290 is preferably always less than the input voltage and, therefore, the tangent function or co-tangent function addressed to the digital-to-analog converter 290 must be limited to an appropriate octant such that the tangent is never required to be greater than 1. In order to accomplish this, the analog multiplexer 282 preferably selects in-phase or out-of-phase sine and cosine signals which are selectively fed to the multiplying digital-to-analog converter 290 and the summing resistor. The following table is provided by way of example:

| Octant | Function | D/A Signal | Resistor Signal | Count Sense |
|--------|----------|------------|-----------------|-------------|
| 1 | Tan | Cos | − Sin | + |
| 2 | Cot | − Sin | Cos | + |
| 3 | Cot | Sin | Cos | + |
| 4 | Tan | Cos | Sin | + |
| 5 | Tan | Cos | − Sin | − |
| 6 | Cot | − Sin | Cos | − |
| 7 | Cot | Sin | Cos | − |
| 8 | Tan | Cos | Sin | − |

In the case of octant 1 in the table of the above example, the cosine signal from the Scott "T" transformers 252, 254 and 256 is fed into the digital-to-analog converter 290 because its magnitude from zero degrees through 45 degrees is greater than the sine, and the sine signal from the Scott "T" transformer is selected as the inverted sine. Based on the above table, the equation solved by a summation amplifier used to measure the difference is (function $\alpha \times$ D/A signal) + (Resistor Signal) = 0, with the various parameters varying with octant. In each case the signals are selected by analog multiplexer 282 such that the larger magnitude signal is always fed to digital-to-analog converter 290 since the digital-to-analog converter 290 output is preferably always less than or equal to the input. The summation is accomplished by feeding the output of the digital-to-analog converter 290 to the summing junction of operational amplifier 224 which is maintained by virtue of its feedback resistor to virtual ground and a summing resistor connected to the smaller of the two signals feeding the summing junction. The output of operational amplifier 224 is therefore equal to the tangent of $\alpha$ (or co-tangent as the function requires) times the expression cosine $\alpha$ − sine $\alpha$.

Thus, the output of summing operational amplifier 224 will be a signal generally proportional to the difference between the input angle $\theta$ and the addressed angle $\alpha$ to the digital-to-analog converter 290. The sense of this signal, that is, whether it is in-phase or out-of-phase with respect to the reference for an angle $\theta$ greater than the angle $\alpha$ is positive for octants 1 through 4 in the table of the above example. To continue that count sense, the signal defined in the above table for octants 5 through 8 would have to be reversed. By way of example, in octant 5, the cosine would have to be "minus" cosine and the sine would have to be "plus" sine. In order to accomplish this central processing unit 150 is preferably conventionally programmed in such a way that it recognizes when it is addressing octants 5 through 8 and inverts the sense or the error signal when central processing unit 150 reads the threshold detectors at the output of the demodulator, treating the count-up signal as a count-down signal and the count-down signal as a count-up signal in quadrants 5 through 8. By so doing, a conventional dual one-out-of-four multiplexer may be employed.

In addition, the system preferably compensates for the error signal out of the summing amplifier 224 not being constant which could result in an increased quantizing error. This compensation can be accomplished by having the microprocessor 150 through a crude digital-to-analog converter adjust the thresholds of the thresholds detectors proportional to the angular location of the digital-to-analog converter 290, such as by directly addressing the crude digital-to-analog converter by a compensating function stored in the microprocessor 150 or by using the three or four most significant bits of the digital-to-analog converter 290 addressed as a direct input to the crude digital-to-analog converter which will increase the thresholds around 45° to compensate for the increased sensitivity of this error signal about the 45° location. By way of example, taking the three most significant bits of the digital-to-analog converter address and adjusting the threshold through the crude digital-to-analog converter reduces the gain error from 40% to approximately 10%.

Summarizing the above with respect to the presently preferred synchro-to-digital converter 164 of the present invention, by programming the digital-to-analog converter with the tangent $\theta$ function and utilizing the current steering cability of the chip, each bit effectively becomes a single-pole-double-throw switch connected to a current source defined as $E_{ref}/R_{ladder}$ with the current being steered to one output or the other depending on whether that particular bit is activated or not. Converter 164 is preferably scaled so that each bit is approximately half the previous bit. The most significant bits steer approximately one half of I max and the least significant bits steer approximately $1/2^n$ of I max. Thus, one steered output is preferably defined as being equal to the expression $$\sum_{1}^{N} \tfrac{1}{2}^n,$$

and the other steered output is preferably defined as $$1 - \sum_{1}^{N} \tfrac{1}{2}^n,$$

where N equals the number of bits in the digital-to-analog converter 290.

Referring now to FIG. 2, a schematic diagram of the microprocessor 150, which is preferably a conventional configuration, such as the TI9980 microprocessor configuration, is shown. Since such a microprocessor configuration is well understood by those of ordinary skill in the art, no detailed description is deemed necessary. Suffice it to say that central processing unit 150 is shown connected to a pair of 2114 RAMs 154a and 154b as well as to a pair of 2716 programmable read only memories or PROMs 152a and 152b. In addition, as shown and preferred in FIG. 2, there is a conventional RAM and ROM decode-select network 400 which includes a pair of conventional decoders 402 and 404. In addition, as shown and preferred, in the configuration of the present invention there are preferably different jumper configurations 406 depending on whether 2716 PROMs or 2532 PROMs are employed for memories 152a and 152b. Thus, by way of example, if 2716 PROMs are employed, the jumper connection represented by reference numeral 406a is employed whereas if 2532 PROMs are utilized instead, the jumper connections represented by reference numeral 406b are employed. In addition, the memory map will conventionally differ depending on whether a 2716 PROM or 2532 PROM is employed. The balance of the conventional circuitry is illustrated in FIG. 2, such as multiplexers 410 and 412 and voltage regulator 414, as well as the previously mentioned central processing unit failure monitor 26 or "deadman timer." It should be noted that the microprocessor represented by FIG. 2 is preferably conventionally programmed in TI9980 assembler language, assuming a TI9980 central processing unit 150 is employed, in order to calculate both mach and VMO from the stored VMO curves, as well as from the measured analog airspeed and altitude signals provided from the on-board analog air data computer. A flow diagram of an exemplary program for accomplishing this is illustrated in collective FIG. 7 whose contents are self-explanatory to one of ordinary skill in the art. Suffice it to say that the desired stored VMO curve is selected by closing the appropriate programming switches 440 associated with the desired VMO curve and, thereafter, the incoming measured airspeed and altitude data is processed to determine VMO and mach number. As was previously mentioned, the above described embodiment of the mach air speed indicator 20 of the present invention is normally employed in an aircraft environment, such as the Boeing 727, in which there is normally no provision of mach number or VMO from the on-board air data computer, with the mach air speed indicator 20 of FIG. 1 internally computing both mach number and VMO from the incoming measured altitude and air speed signals, and with the internal computer 150 thereafter directly driving the VMO and mach displays 50 and 40, respectively.

With respect to the VMO, as was previously mentioned, the internal computer 150 preferably stores a series of VMO curves in the PROM 152a, 152b, which are externally selectable by shorting pins or VMO jumpers 162, which each curve being a function of airplane configuration and determining the appropriate curve for the aircraft to fly for a given configuration. As was previously mentioned, the VMO curve represents maximum allowable air speed as a function of altitude. Accordingly, the mach air speed indicator 20 of the present invention illustrated in FIG. 1, receives analog altitude information, digitizes it, "looks-up" the maximum allowable air speed or VMO from the preselected VMO, and displays the VMO via VMO pointer 50. In addition, as also previously mentioned, the analog air speed input is also digitized and compared with the VMO or maximum allowable air speed to determine whether an "overspeed condition" exists. If such an "overspeed condition" exists, that is if the maximum allowable air speed or VMO is exceeded, as was previously mentioned, an alarm would be activated as a result of closure of overspeed switch 190.

With respect to the determination of mach number by the internal computer 150, such as represented by the flow diagram of FIG. 7, the mach air speed indicator of FIG. 1, takes the digital air speed signal output from the synchro-to-digital converter 164 and uses it to calculate $q_c$, which is the impact pressure, since a measured $q_c$ value is not normally available except from a sophisticated air data computer. The computer 150, similarly, utilizes the digital altitude output of synchro-to-digital converter 164 to determine or compute $P_s$, the static pressure. Again, this is accomplished because a measured $P_s$ signal is not readily available. The computer 150 then functionally solves the expression $q_c/P_s$, as illustrated in FIG. 7, and utilizing this value, from a "look-up" table determines mach number. Thus, both VMO and mach number are electronically provided in instances where the measured parameters which determine mach number are not readily available.

Figure 4:
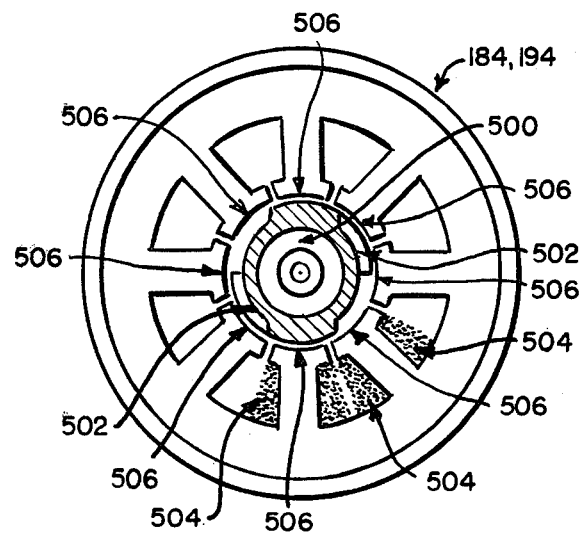
FIG. 4 is a diagrammatic illustration of a typical preferred stepper servo motor employed in the mach airspeed indicator of FIG. 1.

Now referring to FIG. 4, the preferred stepper servo motor for the present invention, such as stepper servo motor 184 employed in the VMO servo loop 174 or stepper motor 194 employed in the mach servo loop 178, is shown. As was previously mentioned, the stepper servo motor 184, 194 permits computer controlled incremental movement of the display, with stepper servo motor 184 controlling such incremental movement of the VMO pointer 50 and with stepper motor 194 controlling such incremental movement of the mach counter 40. The presently preferred stepper servo motor 184, 194 is a permanent magnet type of stepping motor. As is well known, generally the permanent magnet in a stepping motor may be in the rotor or stator which, working with electrically produced flux, causes the poles and teeth to align and effect rotation. Most preferably, and as shown and preferred in FIG. 4, the permanent magnet 500 associated with the preferred stepper servo motor 184 or 194 of the present invention is preferably in the rotor 502. Moreover, as shown and preferred in FIG. 4, the permanent magnet 500 on the stepper motor rotor 502 is preferably skewed so as to bridge a plurality of teeth 506, and most preferably three such teeth 506, as opposed to a conventional one-to-one alignment between the poles and the teeth. In addition to rotor 502, the preferred stepper motor 184 or 194 preferably includes a plurality of stator windings, such as preferably four such windings 504a, 504b, 504c and 504d, which are energized independently in sequence.

The rotor 502 permanent magnet 500 is preferably of a low mass and most preferably is composed of a magnetic material having a high magnetic strength or high intrinsic coercive force, and most preferably a magnetic material having a coerceive force substantially equivalent to that of Samarian-Cobalt and rare earth cobalt magnet. For example, Samarian-Cobalt and Cesium-Cobalt magnets, which have a high permanency and, thus, do not demagnetize easily, have intrinsic coercive forces up to 28000 oersteds as compared with an intrinsic coerceive force of between 4300 and 6800 oersteds for a Platinum-Cobalt magnet. As presently preferred, Samarian-Cobalt is employed for the permanent magnet 500 comprising the stepper motor rotor 502. As a result, the permanent rare earth cobalt magnet 500 of the present invention produces a high detent in the preferred stepper servo motor 184 or 194 and, therefore, the stepper servo motor 184 or 194 consumes no power when the rotor 502 is not moving. The preferred skewing of the permanent magnet 500 distributes the magnetic force so as to reduce the resultant detent torque associated with the rare earth cobalt magnet 500 enabling the use of low power to overcome this reduced detent torque. This enables the motor 184 or 194 to be stepped with low power with a small diameter rotor 502, comprising a small permanent magnet 500, having a high step rate, resulting in a low power, low inertia, small stepper servo motor having a high step rate. Additional damping to prevent overshoot and "mechanical ringing" can be accomplished by fixing a thin conductive sleeve, such as copper, to the stator 504.

Figure 5:
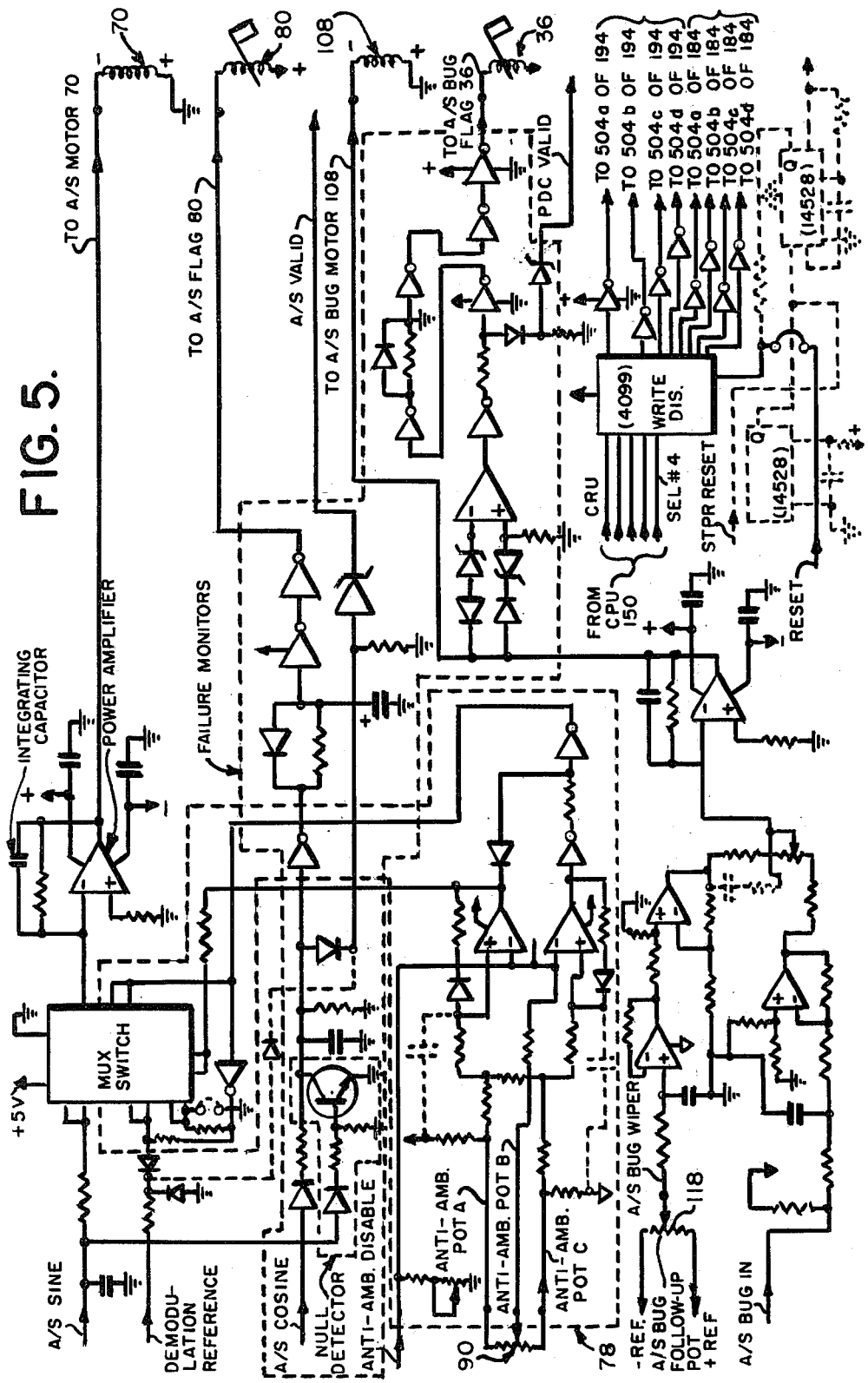
FIG. 5 is a schematic diagram, partially in block, of the servo driver and anti-ambiguity portions of the mach airspeed indicator of FIG. 1.

Referring now to FIG. 5, for purposes of completeness, a schematic of the presently preferred driver circuit arrangement for the mach air speed indicator 20 of the present invention is shown. The configuration illustrated in FIG. 5 is essentially self-explanatory and represents a conventional type of solid state driving circuit for the previously described and preferred stepper servo motors 184 and 194, as well as for the conventional DC servo motors 70 and 108 forming parts of servo loops 174, 178, 68 and 106, respectively. These drivers, 186, 196, 76 and 120 are preferably conventional type of servo driver configurations as illustrated in FIG. 5, with the various driver outputs to the stator windings 504a, 504b, 504c and 504d of each of the mach 194 and VMO 184 stepper servo motors being shown. In addition to the servo driver configuration of FIG. 5, which encompasses drivers 76, 120, 186 and 196, FIG. 5 also illustrates the previously mentioned conventional type of anti-ambiguity circuit 78. The function and operation of the conventional type of servo driver circuitry illustrated in FIG. 5, which employs open collector transistors, is well understood by one of ordinary skill in the art and will not be described in greater detail hereinafter. An alternative embodiment of FIG. 1 is preferably employed in aircraft environments where mach number is provided from the on-board air data computer, such as in a conventional Boeing 747, but where no VMO signal is provided from the on-board air data computer. Thus, the mach air speed indicator may compute the appropriate VMO through the use of central processing unit in the same manner as previously described with reference to the embodiment of FIG 1. However, since mach number is assumed to be readily available in the aircraft environment in which the alternative embodiment is employed, the circuitry associated with the computation of mach number is unnecessary and is omitted. Apart from this, the various components of the alternative embodiment are preferably identical in function and operation with like components illustrated and described with reference to the embodiment 20 of FIG. 1. In addition, the alternative embodiment may employ a reserve fuel switch for providing additional information to the central processing unit as well as an overspeed flag which is also controlled by the CPU failure monitor. Thus, the alternative embodiment internally computes VMO from a plurality of selectable VMO curves in the manner previously described with respect to FIG. 1, and provides a command air speed via air speed bug indicator which may be selectively driven by the computer, and a VMO display via VMO pointer which is driven by the computer.

Thus, by utilizing the mach air speed indicator of the present invention, VMO and/or mach number may be electronically determined and displayed merely from a measured altitude and air speed without the necessity of providing such information from an on-board air data computer. In addition, by utilizing the mach air speed indicator of the present invention, the command air speed bug may be selectively driven by a performance data computer or other computer to indicate to the flight crew the optimum air speed as well as also being selectively manually settable on the instrument. Moreover, the preferred sychro-to-digital converter employed in the present invention enables the use of a single multiplying digital-to-analog converter to achieve all synchro-to-digital conversion.

What is claimed is:

1. In an airspeed indicator apparatus comprising a VMO display means responsive to variable measured airspeed and altitude information provided thereto; the improvement comprising means for receiving said variable measured altitude information and providing an altitude signal therefrom; and a first closed VMO servo loop operatively connected to said variable altitude information receiving means for receiving said altitude signal therefrom and directly driving said VMO display means in response thereto, said first closed VMO servo loop comprising microprocessor means, VMO servo means operatively connected between said microprocessor means and said VMO display means for directly driving said VMO display means in response to servo control signals provided thereto from said microprocessor means, and VMO display position indicating means operatively connected between said VMO display means and said microprocessor means in a feedback path for providing a signal to said microprocessor means indicative of the display position of said VMO display means, said microprocessor means closing said first closed VMO servo loop and storing a predetermined VMO curve and providing a variable desired VMO value servo control signal to said VMO servo motor means in response to said altitude signal, said microprocessor means being capable of providing a servo control error signal to said VMO servo motor means in response to said VMO display position indication signal for nulling said first closed VMO servo loop at said variable desired VMO value, whereby said microprocessor means directly drives said VMO display means by closing said first closed VMO servo loop.

2. An apparatus in accordance with claim 1 wherein said VMO servo motor means comprises a stepper servo motor.

3. An apparatus in accordance with claim 2 wherein said stepper servo motor comprises a detent pole having a plurality of detent pole teeth and a permanent magnet rotor having a plurality of rotor teeth.

4. An apparatus in accordance with claim 3 wherein said permanent magnet rotor comprises a rare earth cobalt magnet.

5. An apparatus in accordance with claim 4 wherein said rare earth cobalt magnet is samarium-cobalt.

6. An apparatus in accordance with claim 3 wherein said permanent magnet rotor has an intrinsic coercive force of at least 20,000 oersteds.

7. An apparatus in accordance with claim 6 wherein said permanent magnet rotor has an intrinsic coercive force of substantially 28,000 oersteds.

8. An apparatus in accordance with claim 3 wherein said permanent magnet rotor is skewed for distributing the magnetic force associated with said permanent magnet rotor over a plurality of detent pole teeth for reducing any associated detent torque.

9. An apparatus in accordance with claim 8 wherein said permanent magnet rotor comprises a rare earth cobalt magnet.

10. An apparatus in accordance with claim 9 wherein said rare earth cobalt magnet is samarium-cobalt.

11. An apparatus in accordance with claim 8 wherein said permanent magnet rotor has an intrinsic coercive force of at least 20,000 oersteds.

12. An apparatus in accordance with claim 11 wherein said permanent magnet rotor has an intrinsic coercive force of substantially 28,000 oersteds.

13. An apparatus in accordance with claim 1 wherein said VMO curve storage means comprises means for storing a plurality of different selectable predetermined VMO curves each dependent on aircraft configuration, said apparatus further comprising means for selecting a predetermined VMO curve from said plurality of curves in accordance with a particular aircraft configuration.

14. An apparatus in accordance with claim 1 wherein said VMO display means comprises a movable VMO pointer means directly driven by said microprocessor means.

15. An apparatus in accordance with claim 1 further comprising means for receiving a predetermined command airspeed signal and a command airspeed bug indicator means responsive to said provided predetermined command airspeed signal for displaying a desired airspeed.

16. An apparatus in accordance with claim 15 wherein said predetermined command airspeed receiving means comprises means for receiving an optimum airspeed signal, said command airspeed bug indicator means comprising means selectively responsive to said optimum airspeed signal for providing said desired airspeed display in accordance therewith.

17. An apparatus in accordance with claim 16 wherein said selectively responsive means comprises means for manually selecting said desired airspeed display while disabling said provided optimum airspeed signal.

18. An apparatus in accordance with claim 1 further comprising means for receiving said measured variable airspeed and providing said received variable airspeed to said microprocessor means, said microprocessor means further providing an overspeed alarm control signal when said measured variable airspeed exceeds said variable desired VMO value.

19. An apparatus in accordance with claim 1 wherein said provided variable measured altitude information comprises analog synchro signals, said means for providing said altitude signal comprising synchro-to-digital conversion means for converting said measured altitude analog synchro signals into digital altitude signals, said microprocessor means being operatively connected to said synchro-to-digital conversion means and being responsive to said digital altitude signals.

20. An apparatus in accordance with claim 19 wherein said synchro-to-digital conversion means comprises a common digital-to-analog conversion means for synthesizing both sin $\theta$ and cos $\theta$, where $\theta$ represents the input synchro angle corresponding to said analog synchro signals.

21. An apparatus in accordance with claim 20 wherein said common digital-to-analog conversion means comprises a single multiplying digital-to-analog conversion means.

22. An apparatus in accordance with claim 21 wherein said multiplying digital-to-analog conversion means comprises a binary scaled R2R resistor ladder network and an MOS transistor switch, said ladder network being operatively connected for feeding said MOS transistor switch.

23. An apparatus in accordance with claim 22 wherein said synchro-to-digital conversion means further comprises summing operational amplifier means for providing said digital altitude signals as an output therefrom, the output of said summing operational amplifier means being operatively connected to said microprocessor means input and comprising a summing junction.

24. An apparatus in accordance with claim 23 wherein said ladder network input is operatively connected to a reference signal source, said MOS transistor switch comprising a pair of FET transistors having a node operatively connected to said ladder network output, said FET switch being operatively connected between ground and said operational amplifier summing junction for switching the current output of said ladder network therebetween in accordance with the activation of a corresponding bit of said digital-to-analog conversion means, said summing operational amplifier means comprising feedback resistance means for holding said summing junction at virtual ground.

25. An apparatus in accordance with claim 24 wherein said digital-to-analog conversion means is addressed by said microprocessor means with a binary signal scaled as a function of the tangent or cotangent of an address angle $\alpha$ dependent on the value of $\alpha$, said synchro-to-digital conversion means converting said analog synchro signals to said digital signals in accordance with the expression cos $\alpha$ tangent $\theta - \sin = 0$, when $\theta$ and $\alpha$ are equal.

26. An apparatus in accordance with claim 25 wherein said apparatus further comprises means for limiting said tangent and cotangent addresses to said digital-to-analog conversion means to an appropriate octant such that said tangent function is not greater than 1.

27. An apparatus in accordance with claim 20 wherein said digital-to-analog conversion means is addressed by said microprocessor means with a binary signal scaled as a function of the tangent or cotangent of an address angle $\alpha$ dependent on the value of $\alpha$, said synchro-to-digital conversion means converting said analog synchro signals to said digital signals in accordance with the expression cos $\alpha$ tangent $\theta - \sin = 0$, when $\theta$ and $\alpha$ are equal.

28. An apparatus in accordance with claim 27 wherein said apparatus further comprises means for limiting said tangent and cotangent addresses to said digital-to-analog conversion means to an appropriate octant such that said tangent function is not greater than 1.

29. An apparatus in accordance with claim 20 wherein said common digital-to-analog conversion means comprises a single multiplying digital-to-analog conversion means.

30. An apparatus in accordance with claim 24 wherein said ladder network is scaled so each bit is substantially equivalent to ½ of the previous bit, said FET switch steering said synchro-to-digital conversion means output between one of two outputs, represented by the expression $$\sum_{1}^{N} \frac{1}{2}^n,$$

where N=the number of bits in said digital-to-analog conversion means, and the other of said outputs, represented by the expression $$1 - \sum_{1}^{N} \frac{1}{2}^n.$$

31. An apparatus in accordance with claim 1 wherein said receiving means further comprises means for receiving said variable measured airspeed information and for providing an airspeed signal therefrom to said microprocessor means, said apparatus further comprising a mach number display means and a second closed mach servo loop operatively connected to said variable airspeed and altitude information receiving means for receiving said airspeed and altitude signals therefrom and directly driving said mach number display means in response thereto.

32. An apparatus in accordance with claim 31 wherein said second closed mach servo loop comprises said microprocessor means and a mach servo motor means operatively connected between said microprocessor means and said mach number display means for directly driving said mach number display means in response to servo control signals provided thereto from said microprocessor means.

33. An apparatus in accordance with claim 32 wherein said microprocessor means further converts said provided airspeed signal into a $q_c$ signal and said provided altitude signal into a $P_s$ signal and combines said converted $q_c$ and $P_s$ signals into a signal corresponding to $q_c/P_s$, said microprocessor means further storing mach number in accordance with $q_c/P_s$, said microprocessor means providing an actual mach number value servo control signal to said second closed mach servo loop dependent on said $q_c/P_s$ signal for directly driving said mach number display to display said actual mach number value.

34. An apparatus in accordance with claim 33 wherein said second closed mach servo loop further comprises mach number display position indicating means operatively connected between said mach number display means and said microprocessor means in a feedback path for providing a signal to said microprocessor means indicative of the display position of said mach number display means, said microprocessor means closing said second closed mach servo loop and being capable of providing a servo control error signal to said mach number servo motor means in response to said mach number display position indication signal for nulling said second closed mach servo loop at said actual mach number value, whereby said microprocessor means directly drives said mach number display means by closing said second closed mach servo loop.

35. An apparatus in accordance with claim 32 wherein said second closed mach servo loop further comprises mach number display position including means operatively connected between said mach number display means and said microprocessor means in a feedback path for providing a signal to said microprocessor means indicative of the display position of said mach number display means, said microprocessor means closing said second closed mach servo loop and being capable of providing a servo control error signal to said mach number servo motor means in response to said mach number display position indication signal for nulling said second closed mach servo loop at said actual mach number value, whereby said microprocessor means directly drives said mach number display means by closing said second closed mach servo loop.

36. An apparatus in accordance with claim 35 wherein said mach servo motor means comprises a stepper servo motor.

37. An apparatus in accordance with claim 36 wherein said stepper servo motor comprises a detent pole having a plurality of detent pole teeth and a permanent magnet rotor having a plurality of rotor teeth.

38. An apparatus in accordance with claim 37 wherein said permanent magnet rotor comprises a rare earth cobalt magnet.

39. An apparatus in accordance with claim 38 wherein said rare earth cobalt magnet is samarium-cobalt.

40. An apparatus in accordance with claim 39 wherein said permanent magnet rotor is skewed for distributing the magnetic force associated with said permanent magnet rotor over a plurality of said detent pole teeth for reducing any associated detent torque.

41. An apparatus in accordance with claim 38 wherein said permanent magnet rotor is skewed for distributing the magnetic force associated with said permanent magnet rotor over a plurality of said detent pole teeth for reducing any associated detent torque.

42. An apparatus in accordance with claim 34 wherein said mach servo motor means comprises a stepper servo motor.

43. An apparatus in accordance with claim 42 wherein said stepper servo motor comprises a detent pole having a plurality of detent pole teeth and a permanent magnet rotor having a plurality of rotor teeth.

44. An apparatus in accordance with claim 43 wherein said permanent magnet rotor comprises a rare earth cobalt magnet.

45. An apparatus in accordance with claim 44 wherein said rare earth cobalt magnet is samarium-cobalt.

46. An apparatus in accordance with claim 45 wherein said permanent magnet rotor is skewed for distributing the magnetic force associated with said permanent magnet rotor over a plurality of said detent pole teeth for reducing any associated detent torque.

47. An apparatus in accordance with claim 44 wherein said permanent magnet rotor is skewed for distributing the magnetic force associated with said permanent magnet rotor over a plurality of said detent pole teeth for reducing any associated detent torque.

48. An apparatus in accordance with claim 32 wherein said microprocessor means is common to said first and second closed servo loops.

49. In an airspeed indicator apparatus comprising a mach number display means for displaying mach number from variable measured airspeed and altitude information provided thereto; the improvement comprising means for receiving said variable measured altitude and airspeed information and for providing an altitude signal and an airspeed signal therefrom; and a first closed mach servo loop operatively connected to said variable measured altitude and airspeed information receiving means for receiving said airspeed and altitude signals therefrom and directly driving said mach number display means in response thereto, said first closed mach servo loop comprising microprocessor means, and mach servo motor means operatively connected between said microprocessor means and said mach number display means for directly driving said mach number display means in response to servo control signals provided thereto from said microprocessor means, said microprocessor means further converting said altitude and airspeed signals into an actual mach number value display servo control signal for directly driving said mach number display means in response thereto.

50. An apparatus in accordance with claim 49 wherein said microprocessor means further converts said provided airspeed signal into a $q_c$ signal and said provided altitude signal into a $P_s$ signal and combines said converted $q_c$ and $P_s$ signals into a signal corresponding to $q_c/P_s$, said microprocessor means further storing mach number in accordance with $q_c/P_s$, said microprocessor means providing an actual mach number value servo control signal to said first closed mach servo loop dependent on said $q_c/P_s$ signal for directly driving said mach number display to display said actual mach number value.

51. An apparatus in accordance with claim 50 wherein said first closed mach servo loop further comprises mach number display position indicating means operatively connected between said mach number display means and said microprocessor means in a feedback path for providing a signal to said microprocessor means indicative of the display position of said mach number display means, said microprocessor means closing said first closed mach servo loop and being capable of providing a servo control error signal to said mach number servo motor means in response to said mach number display position indication signal for nulling said first closed mach servo loop at said actual mach number value, whereby said microprocessor means directly drives said mach number display means by closing said first closed mach servo loop.

52. An apparatus in accordance with claim 49 wherein said first closed mach servo loop further comprises mach number display position indicating means operatively connected between said mach number display means and said microprocessor means in a feedback path for providing a signal to said microprocessor means indicative of the display position of said mach number display means, said microprocessor means closing said first closed mach servo loop and being capable of providing a servo control error signal to said mach number servo motor means in response to said mach number display position indication signal for nulling said first closed mach servo loop at said actual mach number value, whereby said microprocessor means directly drives said mach number display means by closing said first closed mach servo loop.

53. An apparatus in accordance with claim 52 wherein said mach servo motor means comprises a stepper servo motor.

54. An apparatus in accordance with claim 53 wherein said stepper servo motor comprises a detent pole having a plurality of detent pole teeth and a permanent magnet rotor having a plurality of rotor teeth.

55. An apparatus in accordance with claim 54 wherein said permanent magnet rotor comprises a rare earth cobalt magnet.

56. An apparatus in accordance with claim 55 wherein said rare earth cobalt magnet is samarium-cobalt.

57. An apparatus in accordance with claim 56 wherein said permanent magnet rotor is skewed for distributing the magnetic force associated with said permanent magnet rotor over a plurality of said detent pole teeth for reducing any associated detent torque.

58. An apparatus in accordance with claim 55 wherein said permanent magnet rotor is skewed for distributing the magnetic force associated with said permanent magnet rotor over a plurality of said detent pole teeth for reducing any associated detent torque.

59. An apparatus in accordance with claim 51 wherein said mach servo motor means comprises a stepper servo motor.

60. An apparatus in accordance with claim 59 wherein said stepper servo motor comprises a detent pole having a plurality of detent pole teeth and a permanent magnet rotor having a plurality of rotor teeth.

61. An apparatus in accordance with claim 60 wherein said permanent magnet rotor comprises a rare earth cobalt magnet.

62. An apparatus in accordance with claim 61 wherein said rare earth cobalt magnet is samarium-cobalt.

63. An apparatus in accordance with claim 62 wherein said permanent magnet rotor is skewed for distributing the magnetic force associated with said permanent magnet rotor over a plurality of said detent pole teeth for reducing any associated detent torque.

64. An apparatus in accordance with claim 61 wherein said permanent magnet rotor is skewed for distributing the magnetic force associated with said permanent magnet rotor over a plurality of said detent pole teeth for reducing any associated detent torque.

65. An apparatus in accordance with claim 49 further comprising means for receiving a predetermined command airspeed signal and a command airspeed bug indicator means responsive to said provided predetermined command airspeed signal for displaying a desired airspeed.

66. An apparatus in accordance with claim 65 wherein said predetermined command airspeed receiving means comprises means for receiving an optimum airspeed signal, said command airspeed bug indicator means comprising means selectively responsive to said optimum airspeed signal for providing said desired airspeed display in accordance therewith.

67. An apparatus in accordance with claim 66 wherein said selectively responsive means comprises means for manually selecting said desired airspeed display while disabling said provided optimum airspeed signal.

68. An apparatus in accordance with claim 50 further comprising means for receiving a predetermined command airspeed signal and a command airspeed bug indicator means responsive to said provided predetermined command airspeed signal for displaying a desired airspeed.

69. An apparatus in accordance with claim 68 wherein said predetermined command airspeed receiving means comprises means for receiving an optimum airspeed signal, said command airspeed bug indicator means comprising means selectively responsive to said optimum airspeed signal for providing said desired airspeed display in accordance therewith.

70. An apparatus in accordance with claim 69 wherein said selectively responsive means comprises means for manually selecting said desired airspeed display while disabling said provided optimum airspeed signal.

* * * * *